(12) United States Patent
Amin et al.

(10) Patent No.: US 10,494,762 B2
(45) Date of Patent: Dec. 3, 2019

(54) POLYMER COMPOSITION AND PROCESS FOR MAKING THE SAME

(71) Applicant: ARON UNIVERSAL LTD., Bangalore, Karnataka (IN)

(72) Inventors: Ashok Babubhai Amin, Karnataka (IN); Gangula Rajkumar, Bangalore (IN)

(73) Assignee: ARON UNIVERSAL LTD., Bangalore, Karnataka (IN)

( * ) Notice: Subject to any disclaimer, the term of this patent is extended or adjusted under 35 U.S.C. 154(b) by 0 days.

(21) Appl. No.: 14/848,652

(22) Filed: Sep. 9, 2015

(65) Prior Publication Data
US 2017/0030015 A1 Feb. 2, 2017

(30) Foreign Application Priority Data

Jul. 29, 2015 (IN) .............................. 3887/CHE/2015

(51) Int. Cl.
*C08F 212/08* (2006.01)
*C08F 2/22* (2006.01)
(Continued)

(52) U.S. Cl.
CPC .............. *D06P 1/0016* (2013.01); *C08F 2/22* (2013.01); *C08F 2/44* (2013.01); *C08F 212/08* (2013.01);
(Continued)

(58) Field of Classification Search
CPC .. C08F 2/22; C08F 2/44; C08F 212/08; C08F 220/44; C08G 18/673; C08J 3/215; C08K 5/0041
(Continued)

(56) References Cited

U.S. PATENT DOCUMENTS 4,016,133 A 4/1977 Hyosu et al.
4,612,343 A 9/1986 Okuzono et al.
(Continued)

FOREIGN PATENT DOCUMENTS

CN 102030855 A * 4/2011

*Primary Examiner* — Kelechi C Egwim
(74) *Attorney, Agent, or Firm* — Clark & Brody

(57) ABSTRACT

A polymer composition is provided. The polymer composition includes (i) a core polymer; and (ii) a shell polymer formed over the core polymer. The core polymer includes structural units derived from monomers having a Formula I, Formula II, Formula V (optional), and Formula VI:

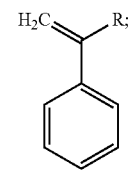

(I)

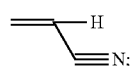

(II)

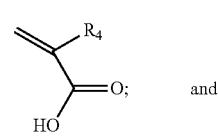

(V, optional)

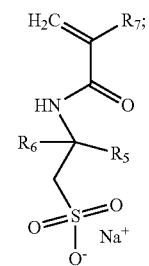

(VI)

and a structural unit derived from a monomer selected from a group consisting of monomers having a Formula III and Formula IV:

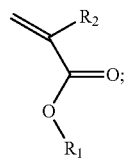

(III)

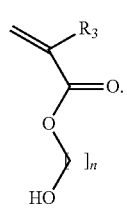

(IV)

The shell polymer includes an active ingredient, a polymer comprising structural units derived from a monomer having Formula, I, Formula II, and Formula VI:

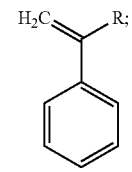

(I)

(Continued)

-continued

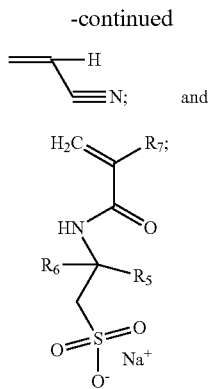

and a structural unit derived from a monomer selected from a group consisting of monomers having a Formula III and Formula IV.

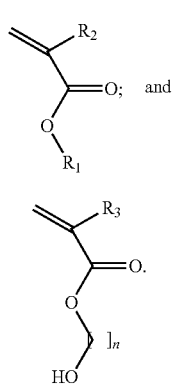

12 Claims, No Drawings

(51) Int. Cl.
| | |
|---|---|
| *C08F 2/44* | (2006.01) |
| *C08F 220/44* | (2006.01) |
| *D06P 1/00* | (2006.01) |
| *C09B 67/02* | (2006.01) |
| *C09B 69/10* | (2006.01) |
| *C09D 11/106* | (2014.01) |
| *C08J 3/12* | (2006.01) |
| *C08J 3/20* | (2006.01) |
| *C08K 5/00* | (2006.01) |
| *C08K 9/12* | (2006.01) |

(52) U.S. Cl.
CPC ............... *C08F 220/44* (2013.01); *C08J 3/12* (2013.01); *C08J 3/203* (2013.01); *C09B 67/0097* (2013.01); *C09B 69/103* (2013.01); *C09D 11/106* (2013.01); *C08J 2325/12* (2013.01); *C08K 5/0041* (2013.01); *C08K 9/12* (2013.01)

(58) Field of Classification Search
USPC .................................. 526/201; 524/458, 817
See application file for complete search history.

(56) References Cited

U.S. PATENT DOCUMENTS

| | | | |
|---|---|---|---|
| 5,008,358 A | 4/1991 | Anderson et al. | |
| 5,114,479 A | 5/1992 | Keaveney et al. | |
| 5,215,679 A * | 6/1993 | Cramm | C08F 2/44 252/301.35 |
| 5,714,090 A | 2/1998 | Waters et al. | |
| 2007/0255008 A1* | 11/2007 | Elder | A61K 8/29 525/217 |

* cited by examiner

POLYMER COMPOSITION AND PROCESS FOR MAKING THE SAME

FIELD OF INVENTION

The present invention is directed to a polymer composition and a process for making the polymer composition. More particularly the present invention is directed to a polymer composition including dispersions having polymeric particles with active ingredients.

BACKGROUND OF INVENTION

One of the greatest challenges faced by industries in the dyestuff business is to provide dye compositions of different colors and hues having desirable fastness and strength properties on a wide range of substrates. To a great extent these industries have managed to provide dyestuffs, pigments, inks, etc...., that have improved fastness properties. Particularly for cotton substrate, considered one of the world's most comfortable and popular fabrics, the range of color fast dyes available is relatively limited. This may be attributed to the fastness properties of the available dyes on cotton substrate.

Fluorescent dyestuff, ultraviolet brightener compositions, etc...., among others, are used according to current fashion trends in leisurewear clothes, as in sportswear and in the work clothes worn outside. They are used in coloring of polyester and polyamide fibers by dyeing and printing or for whitening. There is a growing demand for fluorescent colored/brighter cotton fabric. Fluorescent dyes and Ultra Violet (UV) brighteners available for cotton are limited. It may not be easy to find the right vendor and dyeing operation. The application and machine cleaning processes are expensive and the result is limited quality because the light fastness and wash fastness of currently available fluorescent dyestuffs for cotton is found to be relatively poor. Therefore the current trend is to use fluorescent pigments rather than dyes on cotton. Pigments on cotton look great and offer a wider color palette. However they also involve higher costs and effort in the application process, and there are limitations with the quality of finished goods in respect of color fastness.

Thus there is a continuous need for improved polymer compositions, more particularly polymer compositions that have the required or better light and wash fastness and color strength on a wide variety of substrates including cotton. There is also a need for improved and cost-effective methods for synthesizing these polymer compositions.

SUMMARY OF INVENTION

In one embodiment, is provided a polymer composition. The polymer composition includes (i) a core polymer; and (ii) a shell polymer formed over the core polymer. The core polymer includes structural units derived from monomers having a Formula I, Formula II, Formula V (optional), and Formula VI:

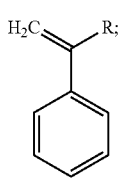

(I)

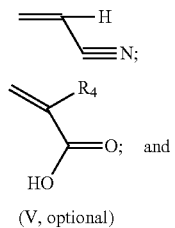

(II)

(V, optional)

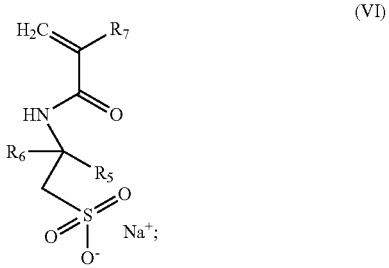

(VI)

and a structural unit derived from a monomer selected from a group consisting of monomers having a Formula III and Formula IV:

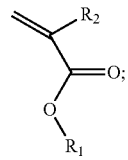

(III)

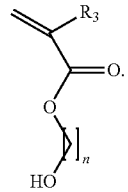

(IV)

wherein in the core polymer the monomer having Formula I is present in a range of from about 20 weight percent to about 80 weight percent based on total weight of the polymer composition; the monomer having Formula II is present in a range of from about 10 weight percent to about 40 weight percent based on the total weight of the polymer composition, and the monomer having Formula III or Formula IV is present in a range of from about 21 weight percent to about 60 weight percent based on the total weight of the polymer composition; the monomer having Formula V is present in a range of from about 0 weight percent to about 3.0 weight percent based on the total weight of the polymer composition, and the monomer having Formula VI is present in a range of from about 2 weight percent to about 20 weight percent based on the total weight of the polymer composition.

The shell polymer includes an active ingredient, a polymer comprising structural units derived from a monomer having Formula, I, Formula II, and Formula VI:

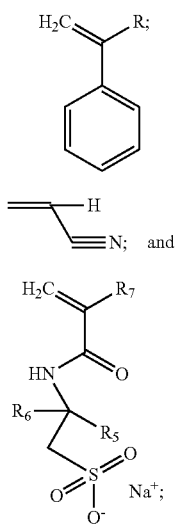

and a structural unit derived from a monomer selected from a group consisting of monomers having a Formula III and Formula IV.

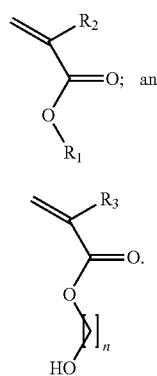

In the shell polymer the monomer having Formula I is present in a range of from about 20 weight percent to about 80 weight percent based on total weight of the polymer composition; the monomer having Formula II is present in a range of from about 10 weight percent to about 40 weight percent based on the total weight of the polymer composition, and the monomer having Formula III or Formula IV is present in a range of from about 21 weight percent to about 60 weight percent based on the total weight of the polymer composition; and the monomer having Formula VI is present in a range of from about 2 weight percent to about 20 weight percent based on the total weight of the polymer composition.

R is an aromatic group selected from the groups consisting of benzyl, (mention connecting points) methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; $R_1$ is an aliphatic group having 1 to 4 carbon atoms; $R_2$ is hydrogen or an aliphatic group having 1 to 4 carbon atoms; $R_3$ is an hydrogen or an aliphatic group having 1 to 4 carbon atoms; $R_4$ is an aliphatic group having 1 to 4 carbon atoms, $R_5$ is an aliphatic group having 1 to 4 carbon atoms; $R_6$ is an aliphatic group having 1 to 5 carbon atoms; $R_7$ is an hydrogen or an aliphatic group having 1 to 4 carbon atoms; and "n" is an integer having a value of 1 to 4.

In another embodiment, is provided a process for preparation of a polymer composition. The process includes a step A of forming a core polymer followed by a step B of forming a shell polymer over the core polymer. The process under step A includes the following steps: (i) forming a first mixture including a surfactant, an optional co-surfactant, an optional dispersing agent, an optional chelating agent, an optional activator, and water;

(ii) heating the first mixture at a temperature in a range of from about 50 degree Celsius to about 100 degree Celsius to form a second mixture;

(iii) cooling the second mixture to a temperature in a range of from about 25 degrees Celsius to about 45 degrees Celsius;

(iv) forming a third mixture comprising monomers having structural units having Formula I, Formula II, and Formula VI:

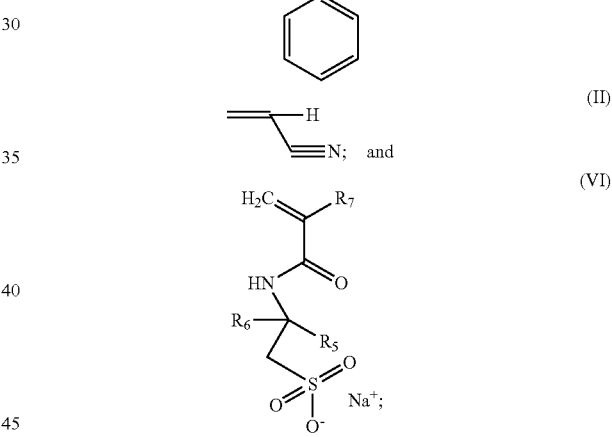

and a monomer selected from a group consisting of monomers having a Formula III and Formula IV:

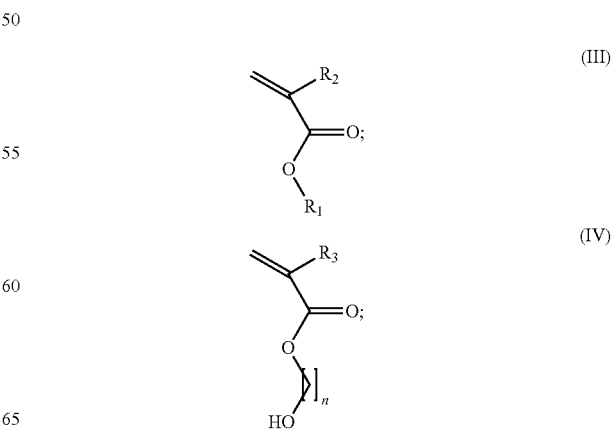

(v) forming an aqueous initiator solution comprising a first aqueous initiator;
(vi) adding a partial quantity of the third mixture and the aqueous initiator solution to the second mixture, a monomer having Formula V (optional), and an optional emulsion stabilizer to form a fourth mixture;
(vii) homogenizing the fourth mixture to form a homogenized fourth mixture;
(viii) heating the homogenized fourth mixture to form a fifth mixture comprising the core polymer;
  B. a Step B of forming a shell polymer over the core polymer comprising:
(ix) forming an active ingredient solution comprising a first active ingredient and an optional chelating agent;
(x) adding the active ingredient solution to the fifth mixture to form a sixth mixture;
(vii) preparing a seventh mixture (feed 1) comprising a monomer selected from a group consisting of monomers having a Formula III and a Formula IV:

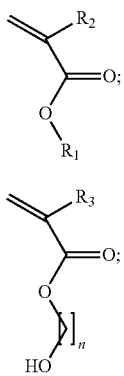

and a second active ingredient; a cross-linker; and an optional organic initiator; wherein the second active ingredient is same as or different from the first active ingredient; wherein $R_1$ is hydrogen or an aliphatic group having 1 to 4 carbon atoms; $R_2$ is an aliphatic group having 1 to 4 carbon atoms, $R_3$ is an aromatic group selected from the groups consisting of benzyl, methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; and "n" is an integer having a value of 1 to 4;
(viii) adding the seventh mixture to the remaining quantity of the third mixture;
(ix) preparing an eighth mixture (feed 2) comprising a second aqueous initiator, an optional surfactant, an optional co-surfactant, an optional dispersing agent, an optional emulsifier, and water
(ix) adding the seventh mixture (feed 1) and the eighth mixture (feed 2) to the sixth mixture to form a ninth mixture; and
(x) heating the ninth mixture to form a mixture comprising an aqueous dispersion of the polymer composition.

In yet another embodiment is provided a process for preparation of a polymer composition. The process includes a step A of forming a core polymer followed by a step B of forming a shell polymer over the core polymer. The process under step A includes the following steps: (i) forming a first mixture including a surfactant, an optional co-surfactant, an optional dispersing agent, an optional chelating agent, an optional activator, and water;
(ii) heating the first mixture at a temperature in a range of from about 50 degree Celsius to about 100 degree Celsius to form a second mixture;
(iii) cooling the second mixture to a temperature in a range of from about 25 degrees Celsius to about 45 degrees Celsius;
(iv) forming a third mixture comprising monomers having structural units having Formula I, Formula II, and Formula VI:

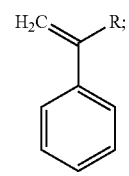

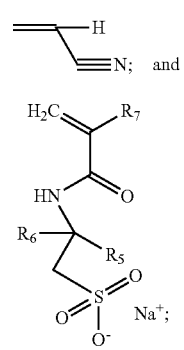

and a monomer selected from a group consisting of monomers having a Formula III and Formula IV:

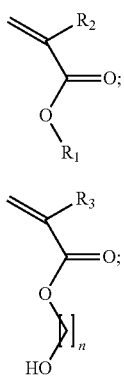

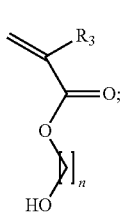

(v) forming an aqueous initiator solution comprising a first aqueous initiator;
(vi) adding a partial quantity of the third mixture and the aqueous initiator solution to the second mixture, a monomer having Formula V (optional), and an optional emulsion stabilizer to form a fourth mixture;
(vii) homogenizing the fourth mixture to form a homogenized fourth mixture;
(viii) heating the homogenized fourth mixture to form a fifth mixture comprising the core polymer;

B. a Step B of forming a shell polymer over the core polymer comprising:

(ix) forming an active ingredient solution comprising a first active ingredient and an optional chelating agent;

(x) adding the active ingredient solution to the fifth mixture to form a sixth mixture;

(vii) preparing a seventh mixture (feed 1) comprising a monomer selected from a group consisting of monomers having a Formula III and a Formula IV:

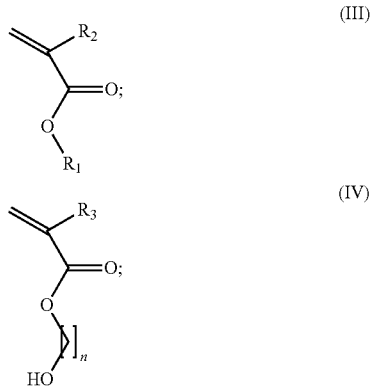

and a second active ingredient; a cross-linker; and an optional organic initiator; wherein the second active ingredient is same as or different from the first active ingredient; wherein $R_1$ is hydrogen or an aliphatic group having 1 to 4 carbon atoms; $R_2$ is an aliphatic group having 1 to 4 carbon atoms, $R_3$ is an aromatic group selected from the groups consisting of benzyl, methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; and "n" is an integer having a value of 1 to 4;

(viii) adding the seventh mixture to the remaining quantity of the third mixture;

(ix) preparing an eighth mixture (feed 2) comprising a second aqueous initiator, an optional surfactant, an optional co-surfactant, an optional dispersing agent, an optional emulsifier, and water (ix) adding the seventh mixture (feed 1) and the eighth mixture (feed 2) to the sixth mixture to form a ninth mixture;

(x) heating the ninth mixture to form a mixture comprising an aqueous dispersion of the polymer composition;

(xi) subjecting the tenth mixture to evaporation to form a concentrate;

(xii) providing a thermal treatment to the concentrate to form a polymer composition in an emulsion form;

(xiii) mixing the emulsion form with hydrophilic fumed silica to form a past form of the polymer composition; and (xiv) drying the paste form of the polymer composition to form a powder form of the polymer composition.

By forming the above disclosed polymer composition an improved, efficient, and cost effective polymer composition may be made available. The polymer composition when used as a coloring material, or as a coating or as an additive for various commercial coloring and additive applications on compatible substrates may impart required and improved wash and light fastness properties to the substrate.

DETAILED DESCRIPTION

Embodiments of the invention as disclosed herein provide a polymer composition. The invention disclosed herein also provides a process for making the polymer composition. The polymer composition includes (i) a core polymer; and (ii) a shell polymer formed over the core polymer. Thus the polymer composition has a core-shell structure. The core polymer includes structural units derived from a monomer having a Formula I, Formula II, Formula V (optional), and Formula VI:

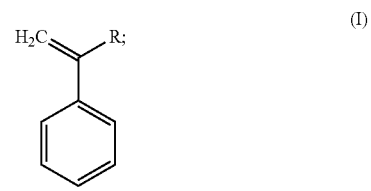

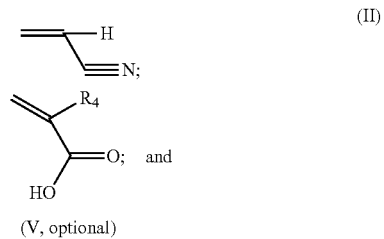

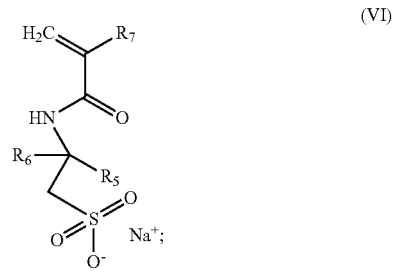

and a structural unit derived from a monomer selected from a group consisting of monomers having a Formula III and Formula IV:

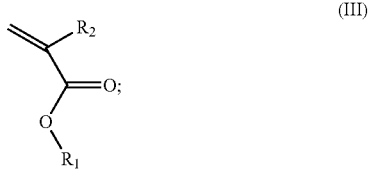

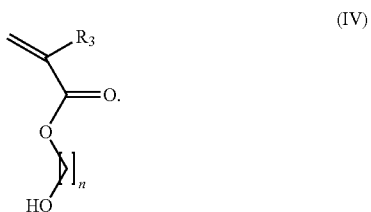

The shell polymer includes an active ingredient, a polymer comprising structural units derived from a monomer having Formula, I, Formula II, and Formula VI:

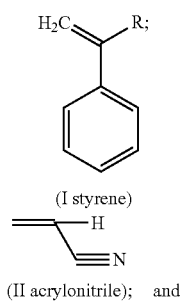

(I styrene)

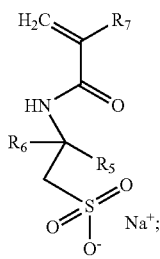

(II acrylonitrile); and

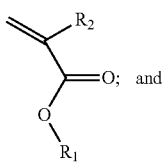

(VI)

and a structural unit derived from a monomer selected from a group consisting of monomers having a Formula III and Formula IV:

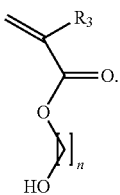

(III)

and (IV)

R is an aromatic group selected from the groups consisting of benzyl, methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; $R_1$ is an aliphatic group having 1 to 4 carbon atoms; $R_2$ is hydrogen or an aliphatic group having 1 to 4 carbon atoms; $R_3$ is an hydrogen or an aliphatic group having 1 to 4 carbon atoms; $R_4$ is an aliphatic group having 1 to 4 carbon atoms, $R_5$ is an aliphatic group having 1 to 4 carbon atoms; $R_6$ is an aliphatic group having 1 to 5 carbon atoms; $R_7$ is an hydrogen or an aliphatic group having 1 to 4 carbon atoms; and "n" is an integer having a value of 1 to 4.

In one embodiment, the polymer composition may have a particle size distribution of $D_v(10)$ to $D_v(90)$ in a range of from about 0.02 micrometers to about 85 micrometers. In another embodiment, the polymer composition may have a particle size distribution of $D_v(10)$ to $D_v(90)$ in a range of from about 0.08 micrometers to about 75 micrometers. In yet another embodiment, the polymer composition may have a particle size distribution of $D_v(10)$ to $D_v(90)$ in a range of from about 2 to about 70 micrometers.

In one embodiment, the polymer composition has a color strength in a range of from about 75 percent to about 100 percent and a dE* value in a range of from about 1 to about 10. In another embodiment, the polymer composition has a color strength in a range of from about 85 percent to about 90 percent and a dE* value in a range of from about 2 to about 8. In yet another embodiment, the polymer composition has a color strength in a range of from about 85 percent to about 90 percent and a dE* value in a range of from about 3 to about 7.

In various embodiments, the active ingredient in the polymer composition may include a dyestuff, an optical brightener, and an Ultra Violet radiation (UV) absorbing material, and the like. The active ingredient may be selected such that it functions to enhance the properties of the substrate in combination with the polymer composition.

In an embodiment, when the active ingredient is a dyestuff, the polymer composition may be referred to as a polymeric dyestuff composition. The polymeric dyestuff composition may be rendered in any physical manner as is known to one skilled in the art. In one embodiment, the polymeric dyestuff composition may be in the form of an aqueous solution. In another embodiment, the polymeric dyestuff composition may be in the form of a powder. In various other embodiments, the polymeric dyestuff composition may be used as a pigment, an ink, or in any other form that is known to a person skilled in the art and is applicable in the industry for various uses as colorant.

In another embodiment, when the active ingredient is an optical brightener the polymer composition may be referred to as a polymeric brightening composition. In one embodiment, the polymeric brightening composition may be used to enhance the aesthetic value when applied as a coating on a substrate to increase the brightness of the substrate.

In yet another embodiment, when the active ingredient is a UV radiation absorber the polymer composition may be referred to as a polymeric UV absorbing composition. The polymeric brightening composition may be used to enhance the aesthetic value when applied as a coating on the substrate to decrease the UV radiation absorbed by the substrate. Decrease in UV radiation absorption improves wash fastness of a colored substrate as known to one skilled in the art.

In certain embodiments, the polymer composition may find application in cosmetic products. In one embodiment, the dyestuff composition may be employed in cosmetics that are used to prevent the skin from being effected by the environment, for example, by UV rays of the Sun.

In one embodiment, any dyestuff that may withstand the process conditions described herein may be employed to form the polymeric dyestuff composition. Accordingly the dyes in various embodiments may include water soluble dyes, water insoluble (solvent soluble dyes, neutral dyes, cationically charged dyes, dispersed dyes, among others. Suitable dyes include but are not limited to dyes selected from benzothioxanthane, xanthane, coumarin, naphthalimide, benzoxanthane, perylene, and acridine. Examples of water-soluble dyes which may be used include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Examples of water-insoluble dyes which may be used include azo, xanthene, methine, polymethine, and anthroquinone dyes. Specific examples of water-insoluble dyes include Ciba-Geigy Orasol Blue GN, Ciba-Geigy Orasol Pink, Ciba-Geigy Orasol Yellow, Lumogen™ fluorescent dyes from BASF, and the like.

Optical brighteners (OB) are known to compensate through their bluish fluorescence (complementary color) for graying and yellowing. They may contribute, as effect substances, in the polymeric compositions, e.g., to increasing the whiteness. Suitable OB used herein are in principle all blue-emitting fluorescent dyes, e.g., the commercially available products, e.g. Ultraphor® (BASF), Leucophor® (Clariant) or Tinopal® (Ciba) or other products from the chemical categories of the stilbenes, distyrylbiphenyls, coumarins, naphthalic acid imides and the benzoxazole and benzimidazole systems linked via double bonds. In one embodiment, any optical brightener that may withstand the process conditions described herein may be employed to form the polymeric optical brightener composition.

UV absorbers used herein function by absorption of damaging UV radiation. These additives generally absorb UV radiation much more strongly than the polymers that they protect. The excited states formed upon UV absorption relax to the ground state extremely rapidly and efficiently through radiation-less processes, which imparts high stabilization efficiency and excellent photostability. UV absorbers are categorized by chemical class, for example benzotriazoles, benzophenones, and triazines. Each class has its own UV absorbance characteristics. For example, benzophenone- and triazine-types tend to absorb more strongly in the short wavelength UV-B region than the benzotriazole-types.

In one embodiment, any UV ray absorber that may withstand the process conditions described herein may be employed to form the polymeric UV ray absorbing composition. Suitable examples of UV ray absorber include: (a) 2-hydroxybenzophenones, (b) 2-hydroxybenzotriazoles and (c) substituted acrylonitrile and the like.

In one embodiment, the active ingredient used in the polymer composition may be present in an amount in a range of from about 0.001 weight percent units to about 6 weight percent based on the total weight of the polymer composition. In another embodiment, the active ingredient used in the polymer composition may be present in an amount in a range of from about 0.002 weight percent units to about 5 weight percent based on the total weight of the polymer composition. In yet another embodiment, the active ingredient used in the polymer composition may be present in an amount in a range of form about 0.005 weight percent to about 4 weight percent based on the total weight of the polymer composition. In one embodiment, the active ingredient used in the polymer composition may be present in an amount in a range of form about 0.5 weight percent to about 2 weight percent based on the total weight of the polymer composition.

Suitable compounds that may be used as the monomer of Formula I include vinylaromatic monomers but are not limited to: styrene, α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, alkoxy having 1 to 10 carbons, haloalkyl having 1 to 10 carbons, carboxy, amino, silane, and alkylamino derivatives having 1 to 10 carbons. In one embodiment, the monomer having Formula I may include silane derivatives that include but are not limited to divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), and poly(phenyl vinyl siloxane). In yet another embodiment, the monomer of Formula I may include nitrogen containing derivatives of monomer of Formula I that include, but are not limited to vinylpyridines such as 2-vinylpyridine or 4-vinylpyridine; lower alkyl ($C_1$-$C_8$) substituted N-vinylpyridines such as 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine; methyl-substituted quinolines and isoquinolines; N-vinylcaprolactam; N-vinylbutyrolactam; N-vinylpyrrolidone; vinyl imidazole; N-vinylcarbazole; N-vinylsuccinimide; (meth)acrylonitrile; o-, m-, or p-aminostyrene; maleimide; N-vinyl-oxazolidone; N,N-dimethylaminoethylvinylether; ethyl-2-cyanoacrylate; vinylacetonitrile; N-vinylphthalimide; N-vinylpyrrolidones such as N-vinylthiopyrrolidone, 3 methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone and 3,4,5-trimethyl-1-vinylpyrrolidone; vinylpyrroles; vinylanilines; and vinylpiperidines.

In one embodiment, the monomer of Formula I used in the core polymer of the polymer composition may be present in an amount in a range of from about 20 weight percent to about 80 weight percent based on a total weight of the polymer composition. In another embodiment, the monomer of Formula I used in the core polymer of the polymer composition may be present in an amount in a range of from about 22 weight percent to about 78 weight percent based on the total weight of the polymer composition. In yet another embodiment, the monomer of Formula I used in the core polymer of the polymer composition may be present in an amount in a range of from about 23 weight percent to about 75 weight percent based on the total weight of the polymer composition. In one embodiment, the monomer of Formula I used in the core polymer of the polymer composition may be present in an amount in a range of from about 27 weight percent to about 38 weight percent based on the total weight of the polymer composition.

In one embodiment, the monomer of Formula I used in the shell polymer of the polymer composition may be present in an amount in a range of from about 20 weight percent to about 80 weight percent based on a total weight of the polymer composition. In another embodiment, the monomer of Formula I used in the shell polymer of the polymer composition may be present in an amount in a range of from about 22 weight percent to about 78 weight percent based on the total weight of the polymer composition. In yet another embodiment, the monomer of Formula I used in the shell polymer of the polymer composition may be present in an amount in a range of from about 23 weight percent to about 75 weight percent based on the total weight of the polymer composition. In one embodiment, the monomer of Formula I used in the shell polymer of the polymer composition may be present in an amount in a range of from about 27 weight percent to about 38 weight percent based on the total weight of the polymer composition.

Suitable compounds that may be used as the monomer of Formula II include ethylenically unsaturated monomer having at least one cyano group. Suitable examples include but are not limited to acrylonitrile, and methacrylonitrile. In various embodiments, other equivalent vinyl nitriles may be employed that are homologs or analogs of acrylonitrile.

In one embodiment, the monomer of Formula II used in the core polymer of the polymer composition may be present in an amount in a range of from about 10 weight percent to about 40 weight percent based on the total weight of the polymer composition. In another embodiment, the monomer of Formula II used in the core polymer of the polymer composition may be present in an amount in a range of from about 11 weight percent to about 38 weight percent based on the total weight of the polymer composition. In yet another embodiment, the monomer of Formula II used in the core polymer of the polymer composition may be present in an amount in a range of from about 12 weight percent to about 35 weight percent based on the total weight of the polymer composition. In one embodiment, the monomer of Formula II used in the core polymer of the polymer composition may be present in an amount in a range of from about 32 weight percent to about 33 weight percent based on the total weight of the polymer composition.

In one embodiment, the monomer of Formula II used in the shell polymer of the polymer composition may be present in an amount in a range of from about 10 weight percent to about 40 weight percent based on the total weight of the polymer composition. In another embodiment, the monomer of Formula II used in the shell polymer of the polymer composition may be present in an amount in a range of from about 11 weight percent to about 38 weight percent based on the total weight of the polymer composition. In yet another embodiment, the monomer of Formula II used in the shell polymer of the polymer composition may be present in an amount in a range of from about 12 weight percent to about 35 weight percent based on the total weight of the polymer composition. In one embodiment, the monomer of Formula II used in the shell polymer of the polymer composition may be present in an amount in a range of from about 32 weight percent to about 33 weight percent based on the total weight of the polymer composition.

Suitable compounds that may be used as the monomer of Formula III include an ethylenically-unsaturated monomer. Suitable examples of compounds of Formula III include the polar acrylate esters and substituted acrylamide monomers containing a carboxylic ester group. Suitable examples of monomer of Formula III include but are not limited to di-, tri-, tetra-, or higher multifunctional ethylenically unsaturated monomers. Suitable ethylenically-unsaturated monomers of Formula III include (meth)acrylic acid, (meth)acrylamides, alkyl(meth)acrylates that include but are not limited to acrylic and methacrylic acid esters of straight-chain or branched monoalcohols having 1 to 24 carbon atoms, alkenyl(meth)acrylates, aromatic(meth)acrylates, and cycloaliphatic(meth)acrylates. Suitable compounds that may be used as the compound of Formula III include, but are not limited to methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate, behenyl methacrylate, trimethylcyclohexyl acrylate, t-butyl cyclohexyl acrylate, cyclohexyl methacrylate, isobornyl methacrylate, benzyl acrylate, and benzyl methacrylate 2,2-dimethylpropane-1,3-diacrylate. The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups. The alkyl(meth)acrylate monomers useful in the present invention are alternatively a single monomer or a mixture having different numbers of carbon atoms in the alkyl portion.

Other monomers that may be employed as the compound of Formula III include but are not limited to (meth)acrylamide monomers with a dialkylamino group or dialkylaminoalkyl group in the alkyl radical. Examples of such substituted (meth)acrylates and (meth)acrylamides include, but are not limited to: dimethylaminoethyl methacrylate, dimethylaminoethyl acrylate, N,N-dimethylaminoethyl methacrylamide, N,N-dimethyl-aminopropyl methacrylamide, N,N-dimethylaminobutyl methacrylamide, N,N-di-ethylaminoethyl methacrylamide, N,N-diethylaminopropyl methacrylamide, N,N-diethylaminobutyl methacrylamide, N-(1,1-dimethyl-3-oxobutyl)acrylamide, N-(1,3-diphenyl-1-ethyl-3-oxobutyl)acrylamide, N-(1-methyl-1-phenyl-3-oxobutyl)methacrylamide, and 2-hydroxyethyl acrylamide, N-methacrylamide of aminoethylethyleneurea, N-methacryloxyethyl morpholine, and N-maleimide of dimethylaminopropylamine.

In yet other embodiments, other substituted (meth)acrylate monomers that may be used as monomer of Formula III in the instant disclosure are silicon-containing monomers such as γ-propyl trialkoxysilyl(meth)acrylate having 1 to 6 carbons, γ-propyl trialkylsilyl(meth)acrylate having 1 to 6 carbons, γ-propyl dialkoxy alkylsilyl(meth)acrylate the alkoxy and alkyl having 1 to 6 carbons, γ-propyl dialkylalkoxysilyl(meth)acrylate the alkoxy and alkyl having 1 to 6 carbons, vinyl trialkoxysilyl(meth)acrylate having 1 to 6 carbons, vinyl dialkoxy alkylsilyl(meth)acrylate the alkoxy and alkyl having 1 to 6 carbons, vinylalkoxy dialkylsilyl(meth)acrylate the alkoxy and alkyl having 1 to 6 carbons, vinyl trialkyl silyl(meth)acrylate, and mixtures thereof.

In one embodiment, the monomer of Formula III used in the core polymer of the polymer composition may be present in an amount in a range of from about 21 weight percent to about 60 weight percent based on the total weight of the polymer composition. In another embodiment, the monomer of Formula III used in the core polymer of the polymer composition may be present in an amount in a range of from about 22 weight percent to about 48 weight percent based on the total weight of the polymer composition. In yet another embodiment, the monomer of Formula III used in the core polymer of the polymer composition may be present in an amount in a range of from about 23 weight percent to about 45 weight percent based on the total weight of the polymer composition. In one embodiment, the monomer of Formula III used in the core polymer of the polymer composition may be present in an amount in a range of from about 28 weight percent to about 38 weight percent based on the total weight of the polymer composition.

In one embodiment, the monomer of Formula III used in the shell polymer of the polymer composition may be present in an amount in a range of from about 21 weight percent to about 60 weight percent based on the total weight of the polymer composition. In another embodiment, the monomer of Formula III used in the shell polymer of the polymer composition may be present in an amount in a range of from about 22 weight percent to about 48 weight percent based on the total weight of the polymer composition. In yet another embodiment, the monomer of Formula III used in the shell polymer of the polymer composition may be present in an amount in a range of from about 23 weight percent to about 45 weight percent based on the total weight of the polymer composition. In one embodiment, the monomer of Formula III used in the shell polymer of the polymer composition may be present in an amount in a range of from about 28 weight percent to about 38 weight percent based on the total weight of the polymer composition.

Suitable compounds that may be used as the monomers of Formula IV include ethylenically-unsaturated monomer having hydrophilic groups. In one embodiment, the monomer of Formula IV includes hydroxyalkyl(meth)acrylate monomers in which the substituted alkyl group is a alkyl group having 2 to 6 carbon atoms either branched or unbranched. Suitable hydroxyalkyl(meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof. In one embodiment, the hydroxyalkyl(meth)acrylate monomers include HEMA, 1-methyl-2-hydroxyethyl methacrylate, 2-hydroxypropyl methacrylate, and mixtures thereof. A mixture of the latter two monomers is commonly referred to as "hydroxypropyl methacrylate" or "HPMA." Other monomers that can be employed as the compound of Formula IV include polyethylene glycol acrylates and methacrylates, and hydrophobically terminated polyethylene glycol acrylates and methacrylates, for example, HO(CH2CH2O)3-methacrylate (3PEGMA). In various embodiments, suitable monomers of Formula IV include but are not limited to, ethylene glycol diacrylate, trimethylol propane triacrylate, diethylene glycol divinyl ether, ethyleneglycol dimethacrylate, diethyleneglycol di(meth)acrylate, propyleneglycol di(meth)acrylate, trimethylolpropane tri(meth)acrylate, 2,2-dimethylpropane-1,3-diacrylate, 1,3-butylene glycol di(meth)acrylate, 1,4-butanediol diacrylate, 1,6-hexanediol di(meth)acrylate, tripropylene glycol diacrylate, triethylene glycol dimethacrylate, polyethylene glycol 200 diacrylate, tetraethylene glycol di(meth)acrylate, polyethylene glycol dimethacrylate, ethoxylated bisphenol A di(meth)acrylate, polyethylene glycol 600 dimethacrylate, poly(butanediol)diacrylate, pentaerythritol triacrylate, trimethylolpropane triethoxy triacrylate, glyceryl propoxy triacrylate, pentaerythritol tetra(meth)acrylate, and dipentaerythritol monohydroxypentaacrylate, In one embodiment, the monomer of Formula IV used in the core polymer of the polymer composition may be present in an amount in a range of from about 21 weight percent to about 60 weight percent based on the total weight of the polymer composition. In another embodiment, the monomer of Formula IV used in the core polymer of the polymer composition may be present in an amount in a range of from about 22 weight percent to about 48 weight percent based on the total weight of the polymer composition. In yet another embodiment, the monomer of Formula IV used in the core polymer of the polymer composition may be present in an amount in a range of from about 23 weight percent to about 45 weight percent based on the total weight of the polymer composition. In one embodiment, the monomer of Formula IV used in the core polymer of the polymer composition may be present in an amount in a range of from about 28 weight percent to about 38 weight percent based on the total weight of the polymer composition.

In one embodiment, the monomer of Formula IV used in the shell polymer of the polymer composition may be present in an amount in a range of from about 20 weight percent to about 60 weight percent based on the total weight of the polymer composition. In another embodiment, the monomer of Formula IV used in the shell polymer of the polymer composition may be present in an amount in a range of from about 22 weight percent to about 48 weight percent based on the total weight of the polymer composition. In yet another embodiment, the monomer of Formula IV used in the shell polymer of the polymer composition may be present in an amount in a range of from about 23 weight percent to about 45 weight percent based on the total weight of the polymer composition. In one embodiment, the monomer of Formula IV used in the shell polymer of the polymer composition may be present in an amount in a range of from about 28 weight percent to about 38 weight percent based on the total weight of the polymer composition.

Suitable compounds that may be used as the monomer of Formula V include acrylic acid, methacrylic acid, succinic acid, and the like.

In one embodiment, the monomer of Formula V used in the core polymer of the polymer composition may be present in an amount in a range of from about 0 weight percent to about 3.0 weight percent based on the total weight of the polymer composition. In another embodiment, the monomer of Formula V used in the core polymer of the polymer composition may be present in an amount in a range of from about 0.3 weight percent to about 2.5 weight percent based on the total weight of the polymer composition. In yet another embodiment, the monomer of Formula V used in the core polymer of the polymer composition may be present in an amount in a range of from about 0.6 weight percent to about 2.0 weight percent based on the total weight of the polymer composition. In one embodiment, the monomer of Formula V used in the core polymer of the polymer composition may be present in an amount in a range of from about 1.0 weight percent to about 1.5 weight percent based on the total weight of the polymer composition.

Suitable compound that may be used as the monomers of Formula VI include vinyl monomers containing sulfonate group. Suitable examples include but are not limited to salts of 2-acrylamido-2-methylpropane sulfonic acid (AMPS) (i.e., sodium or ammonium salts of AMPS), vinyl sulfonic acid, styrene sulfonic acid, vinylbenzenesulfonic acid, acryloxysulfonic acid and their corresponding salts, vinyl sulfonates described in U.S. Pat. No. 3,666,810, vinylsulfonic acid, allylsulfonic acid, styrene-sulfonic acid, vinylbenzylsulfonic acid, acryloyloxyethylsulfonic acid, methacryloyloxyethylsulfonic acid, and a vinyl ester of an alkylsulfosuccinic acid, and salts thereof such as lithium, sodium, potassium and ammonium salts. These sulfonate containing monomers impart a high degree of stability to the emulsions.

In one embodiment, the monomer of Formula VI used in the core polymer of the polymer composition may be present in an amount in a range of from about 2 weight percent to about 20.00 weight percent based on the total weight of the polymer composition. In another embodiment, the monomer of Formula VI used in the core polymer of the polymer composition may be present in an amount in a range of from about 4 weight percent to about 18.00 weight percent based on the total weight of the polymer composition. In yet another embodiment, the monomer of Formula VI used in the core polymer of the polymer composition may be present in an amount in a range of from about 5 weight percent to about 15.00 weight percent based on the total weight of the polymer composition. In one embodiment, the monomer of Formula VI used in the core polymer of the polymer composition may be present in an amount in a range of from about 8 weight percent to about 10.00 weight percent based on the total weight of the polymer composition.

In one embodiment, the monomer of Formula VI used in the shell polymer of the polymer composition may be present in an amount in a range of from about 2 weight percent to about 20.00 weight percent based on the total weight of the polymer composition. In another embodiment, the monomer of Formula VI used in the shell polymer of the polymer composition may be present in an amount in a range of from about 4 weight percent to about 18.00 weight percent based on the total weight of the polymer composition. In yet another embodiment, the monomer of Formula VI used in the shell polymer of the polymer composition may be present in an amount in a range of from about 5 weight percent to about 15.00 weight percent based on the total weight of the polymer composition. In one embodiment, the monomer of Formula VI used in the shell polymer of the polymer composition may be present in an amount in a range of from about 8 weight percent to about 10.00 weight percent based on the total weight of the polymer composition.

In another embodiment is provided a process for preparation of a polymer composition. The process includes a step A of forming a core polymer followed by a step B of forming a shell polymer over the core polymer. The process under step A includes the following steps: (i) forming a first mixture including a surfactant, an optional co-surfactant, an optional dispersing agent, an optional chelating agent, an optional activator, and water;
(ii) heating the first mixture at a temperature in a range of from about 50 degree Celsius to about 100 degree Celsius to form a second mixture;
(iii) cooling the second mixture to a temperature in a range of from about 25 degrees Celsius to about 45 degrees Celsius;
(iv) forming a third mixture comprising monomers having structural units having Formula I, Formula II, and Formula VI:

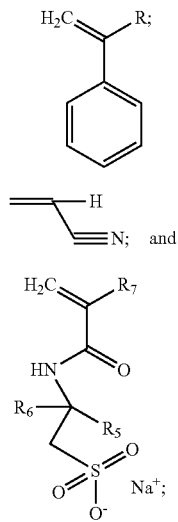

and a monomer selected from a group consisting of monomers having a Formula III and Formula IV:

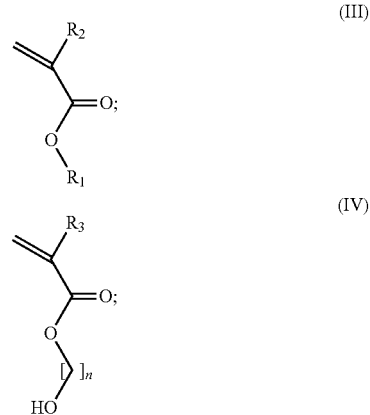

(v) forming an aqueous initiator solution comprising a first aqueous initiator;
(vi) adding a partial quantity of the third mixture and the aqueous initiator solution to the second mixture, a monomer having Formula V (optional), and an optional emulsion stabilizer to form a fourth mixture;
(vii) homogenizing the fourth mixture to form a homogenized fourth mixture;
(viii) heating the homogenized fourth mixture to form a fifth mixture comprising the core polymer;
B. a Step B of forming a shell polymer over the core polymer comprising:
(ix) forming an active ingredient solution comprising a first active ingredient and an optional chelating agent;
(x) adding the active ingredient solution to the fifth mixture to form a sixth mixture;
(vii) preparing a seventh mixture (feed 1) comprising a monomer selected from a group consisting of monomers having a Formula III and a Formula IV:

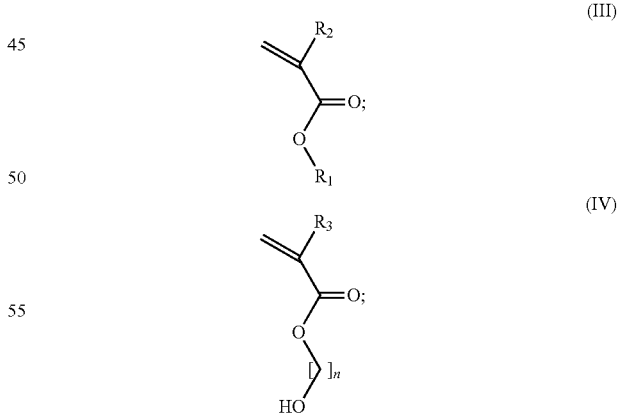

and a second active ingredient; a cross-linker; and an optional organic initiator; wherein the second active ingredient is same as or different from the first active ingredient; wherein $R_1$ is hydrogen or an aliphatic group having 1 to 4 carbon atoms; $R_2$ is an aliphatic group having 1 to 4 carbon atoms, $R_3$ is an aromatic group selected from the groups consisting of benzyl, methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; and "n" is an integer having a value of 1 to 4;

(viii) adding the seventh mixture to the remaining quantity of the third mixture;

(ix) preparing an eighth mixture (feed 2) comprising a second aqueous initiator, an optional surfactant, an optional co-surfactant, an optional dispersing agent, an optional emulsifier, and water (ix) adding the seventh mixture (feed 1) and the eighth mixture (feed 2) to the sixth mixture to form a ninth mixture; and (x) heating the ninth mixture to form a mixture comprising an aqueous dispersion of the polymer composition.

In certain embodiments, the various mixtures described herein may be added in complete portions or in parts over a period of time. For example the seventh and eighth mixtures may be added in portions over a period of time to moderate the reactions, ensure completion of reactions, preventing coagulation by adding in parts, etc. . . . . These modes of additions can be determined by one skilled in the art without much effort based on the type of raw material being employed.

In one embodiment the tenth mixture may be subjected to an evaporation step to form a concentrate. The concentrate may then be provided a thermal treatment to form a polymer composition in a concentrate form. For example, a thermal treatment may include the following steps. After completion of addition of feed 1 and feed 2, the resultant ninth mixture may be heated to a temperature of about 80 degrees Celsius in a period of about 30 minutes and maintained at 80 degree Celsius for about 60 minutes. The resultant mixture may then be heated to a temperature of about 90 degree Celsius in a period of about 30 minutes and maintained at 80 degree Celsius for about 60 minutes. The resultant mixture may then be concentrated under high vacuum distillation at a temperature of about 40 to 50 degree Celsius to achieve a total solid content of about 40 percent. The resultant mixture may be heated to a temperature of about 80 degrees Celsius in a period of about 30 minutes and maintained at 80 degree Celsius for about 8 hours and then allowed to cool to room temperature.

The surfactant used herein may assist in lowering the interfacial tension, which allows the emulsification of reactive vinyl monomers and the formation of stable colloidal dispersions of polymer particles. In one embodiment, the surfactant employed in the formation of the core polymer may include a sulfate. Suitable sulfates include sodium salt of tridecylethersulfate, ammonium laurylsulfate, Octylphenol Ethoxylate (Triton™ X 405), nonionic speciality alkoxylate surfactant (Triton™ X 207), sodium laurylsulfate, and sodium dodecylethersulfate.

In one embodiment, the surfactant employed in the formation of the core polymer may be used in an amount in a range of from about 0.5 weight percent to about 7.0 weight percent based on the total weight of the polymer composition. In another embodiment, the surfactant employed in the formation of the core polymer may be used in an amount in a range of from about 1.0 weight percent to about 6.0 weight percent based on the total weight of the polymer composition. In yet another embodiment, the surfactant employed in the formation of the core polymer may be used in an amount in a range of from about 1.5 weight percent to about 5.5 weight percent based on the total weight of the polymer composition. In one embodiment, the surfactant employed in the formation of the core polymer may be used in an amount in a range of from about 4.0 weight percent to about 4.5 weight percent based on the total weight of the polymer composition.

The co-surfactants used herein may assist in the formulation of a single-phase microemulsion. Water soluble monomers may act as co-surfactants, as they consist of a polymerizable hydrophobic vinyl group and a polar group. In one embodiment, the optional co-surfactant employed in the formation of the core polymer may include an alcohol or a polyol. Suitable examples of the optional co-surfactant employed in the formation of the core polymer may include propyleneglycol, cremphor RH40, ethylene glycol, ethanol, 1-butanol, isopropanol, glycerol, polyethyleneglycol (e.g., PEG 600, PEG 400), and the like.

In one embodiment, the co-surfactant employed in the formation of the core polymer may be used in an amount in a range of from about 0 weight percent to about 4.0 weight percent based on the total weight of the polymer composition. In another embodiment, the co-surfactant employed in the formation of the core polymer may be used in an amount in a range of from about 0.5 weight percent to about 3.5 weight percent based on the total weight of the polymer composition. In yet another embodiment, the co-surfactant employed in the formation of the core polymer may be used in an amount in a range of from about 0.75 weight percent to about 3.0 weight percent based on the total weight of the polymer composition. In one embodiment, the co-surfactant employed in the formation of the core polymer may be used in an amount in a range of from about 1.0 percent to about 1.5 weight percent based on the total weight of the polymer composition.

Suitable chelating agents used in the process for preparation of a polymer composition may include, but are limited to mono, di, tri, and tetra salts of ethylenediaminetetraacetic acid, nitrilotriacetic acid, and the like.

In one embodiment, the optional chelating agent employed in the formation of the core polymer may be used in an amount in a range of from about 0.5 weight percent to about 7.0 weight percent based on the total weight of the polymer composition. In another embodiment, the optional chelating agent employed in the formation of the core polymer may be used in an amount in a range of from about 1.0 weight percent to about 6.0 weight percent based on the total weight of the polymer composition. In yet another embodiment, the optional chelating agent employed in the formation of the core polymer may be used in an amount in a range of from about 1.5 weight percent to about 5.5 weight percent based on the total weight of the polymer composition. In one embodiment, the optional chelating agent employed in the formation of the core polymer may be used in an amount in a range of from about 4.0 weight percent to about 4.5 weight percent based on the total weight of the polymer composition.

In one embodiment, the optional activating agent employed in the formation of the core polymer may include ferrous sulfate.

In one embodiment, the optional activating agent employed in the formation of the core polymer may be used in an amount in a range of from about 0.5 weight percent to about 7.0 weight percent based on the total weight of the polymer composition. In another embodiment, the optional activating agent employed in the formation of the core polymer may be used in an amount in a range of from about 1.0 weight percent to about 6.0 weight percent based on the total weight of the polymer composition. In yet another embodiment, the optional activating agent employed in the formation of the core polymer may be used in an amount in a range of from about 1.5 weight percent to about 5.5 weight percent based on the total weight of the polymer composition. In one embodiment, the optional activating agent employed in the formation of the core polymer may be used in an amount in a range of from about 4.0 weight percent to about 4.5 weight percent based on the total weight of the polymer composition.

In one embodiment, water employed in the formation of the core polymer may be used in an amount in a range of from about 40 weight percent to about 90 weight percent based on the total weight of the polymer composition. In another embodiment, water employed in the formation of the core polymer may be used in an amount in a range of from about 55 weight percent to about 70 weight percent based on the total weight of the polymer composition. In yet another embodiment, water employed in the formation of the core polymer may be used in an amount in a range of from about 60 weight percent to about 68 weight percent based on the total weight of the polymer composition. In one embodiment, water employed in the formation of the core polymer may be used in an amount in a range of from about 63 percent to about 66 percent based on the total weight of the polymer composition.

Suitable free-radical polymerization initiators are in principle all those which are able to trigger a free-radical polymerization. The aqueous initiator used herein may include water-soluble initiator comprises a nonionic peroxide, and, optionally, one or more reducing agents. They can be peroxides, hydroperoxides, and azo compounds as discussed in U.S. Pat. No. 6,727,318. In one embodiment, the first aqueous initiator employed in the formation of the core polymer may include sulfates like ammonium persulfate, potassium persulfate, sodium persulfate; and azo and diazo compounds, such as 2,2'-azobisisobutyronitrile, 2,2'-azobis (2,4-dimethyl valeronitrile), 2,2'-azobis(2,3-dimethyl butyronitrile), 2,2'-azobis(2-methyl butyronitrile), 2,2'-azobis(2, 3,3-trimethyl butyronitrile), $2,2^{1\prime}$-azobis(2-isopropyl butyronitrile), $1,_{1}{}^{\prime}$-azobis(cyclohexane-1-carbonitrile), 2,2'-azobis(4-methoxyl-2,4-dimethylvaleronitrile), 2-(carbamoylazo) isobutyronitrile, 4,4'-azobis(4-cyanovaleric acid), and dimethyl-2,2'azobis isobutyrate. Suitable activators may include but are not limited peroxide compounds, such as butyl peroxide, propyl peroxide, butyryl peroxide, benzoyl isobutyryl peroxide, and benzoyl peroxide or any redox initiators.

In one embodiment, the first aqueous initiator employed in the formation of the core polymer may be used in an amount in a range of from about 0.01 weight percent to about 0.2 weight percent based on the total weight of the polymer composition. In another embodiment, the first aqueous initiator employed in the formation of the core polymer may be used in an amount in a range of from about 0.05 weight percent to about 0.15 weight percent based on the total weight of the polymer composition. In yet another embodiment, the first aqueous initiator employed in the formation of the core polymer may be used in an amount in a range of from about 0.06 weight percent to about 0.12 weight percent based on the total weight of the polymer composition. In one embodiment, the first aqueous initiator employed in the formation of the core polymer may be used in an amount in a range of from about 0.08 percent to about 0.1 percent based on the total weight of the polymer composition.

In one embodiment, the surfactant employed in the formation of the shell polymer may include a sulfate. Suitable sulfates include sodium salt of tridecylethersulfate, ammonium laurylsulfate, Triton™ X 405, Triton X207, sodium laurylsulfate, and sodium dodecylethersulfate. In various embodiments, the surfactant employed in the formation of the core polymer and the shell polymer may be same or different.

In one embodiment, the surfactant employed in the formation of the shell polymer may be used in an amount in a range of from about 0.5 weight percent to about 5.0 weight percent based on the total weight of the polymer composition. In another embodiment, the surfactant employed in the formation of the shell polymer may be used in an amount in a range of from about 1.0 weight percent to about 4.0 weight percent based on the total weight of the polymer composition. In yet another embodiment, the surfactant employed in the formation of the shell polymer may be used in an amount in a range of from about 1.7 percent to about 2.5 percent based on the total weight of the polymer composition. In one embodiment, the surfactant employed in the formation of the shell polymer may be used in an amount in a range of from about 2.0 weight percent to about 2.5 weight percent based on the total weight of the polymer composition.

The cross-linkers used herein may assist in forming bonds that link one polymer chain to another and improves cross linking efficiency, heat resistance, and mechanical properties. Cross-linkers are typically multifunctional compounds. In one embodiment, the cross-linker employed in the formation of the shell polymer may include trimethylolpropanetrimethacrylate, ethoxylatedtrimethylolpropane trimethylolpropane triacryalte, triethylene glycol diacrylate, triallyl isocyanurate, 2,2-bis[4-(2-hydroxy-3-methacryloxypropoxy)phenyl]propane and the like.

In one embodiment, the cross-linker employed in the formation of the shell polymer may be used in an amount in a range of from about 0.5 weight percent to about 7.5 weight percent based on the total weight of the polymer composition. In another embodiment, the cross-linker employed in the formation of the shell polymer may be used in an amount in a range of from about 1.0 weight percent to about 7.0 weight percent based on the total weight of the polymer composition. In yet another embodiment, the cross-linker employed in the formation of the shell polymer may be used in an amount in a range of from about 2.0 weight percent to about 6.5 weight percent based on the total weight of the polymer composition. In one embodiment, the cross-linker employed in the formation of the shell polymer may be used in an amount in a range of from about 1.5 weight percent to about 2.0 weight percent based on the total weight of the polymer composition.

Suitable organic initiators that may be employed in the formation of the shell polymer may include but are not limited to ditertiarybutylperoxide, tertiary butylhydroperoxide, and the like. In one embodiment the organic initiator is tertiary butyl hydroperoxide.

In one embodiment, the organic initiator employed in the formation of the shell polymer may be used in an amount in a range of from about 0.1 weight percent to about 7.5 weight percent based on the total weight of the polymer composition. In another embodiment, the organic initiator employed in the formation of the shell polymer may be used in an amount in a range of from about 1.0 weight percent to about 7.0 weight percent based on the total weight of the polymer composition. In yet another embodiment, the organic initiator employed in the formation of the shell polymer may be used in an amount in a range of from about 2.0 weight percent to about 6.5 weight percent based on the total weight of the polymer composition. In one embodiment, the organic initiator employed in the formation of the shell polymer may be used in an amount in a range of from about 1.5 weight percent to about 2.0 weight percent based on the total weight of the polymer composition.

In one embodiment, the second aqueous initiator employed in the formation of the shell polymer may include a thermal initiator or a redox initiator. Suitable examples of the second aqueous initiator include inorganic persulfates selected from ammonium persulfate, potassium persulfate, sodium persulfate, and the like. In one embodiment, the second aqueous initiator is ammonium persulfate.

In one embodiment, the second aqueous initiator employed in the formation of the shell polymer may be used in an amount in a range of from about 0.1 weight percent to about 0.9 weight percent based on the total weight of the polymer composition. In another embodiment, the second aqueous initiator employed in the formation of the shell polymer may be used in an amount in a range of from about 0.3 weight percent to about 0.8 weight percent based on the total weight of the polymer composition. In yet another embodiment, the second aqueous initiator employed in the formation of the shell polymer may be used in an amount in a range of from about 0.5 weight percent to about 0.7 weight percent based on the total weight of the polymer composition. In one embodiment, the second aqueous initiator employed in the formation of the shell polymer may be used in an amount in a range of from about 0.35 weight percent to about 0.45 weight percent based on the total weight of the polymer composition.

In one embodiment, the optional surfactant employed in the formation of the shell polymer may include a sulfate. Suitable sulfates include sodium salt of tridecylethersulfate, ammonium laurylsulfate, Triton™ X-405, Triton™ X-207, sodium laurylsulfate, and sodium dodecylethersulfate. In various embodiments, the surfactants and their amounts employed in the core polymer and shell polymer may be the same or different.

In one embodiment, the optional surfactant employed in the formation of the shell polymer may be used in an amount in a range of from about 0 weight percent to about 7.0 weight percent based on the total weight of the polymer composition. In another embodiment, the surfactant employed in the formation of the shell polymer may be used in an amount in a range of from about 1.0 weight percent to about 6.0 weight percent based on the total weight of the polymer composition. In yet another embodiment, the surfactant employed in the formation of the shell polymer may be used in an amount in a range of from about 1.5 percent to about 5.5 percent based on the total weight of the polymer composition. In one embodiment, the surfactant employed in the formation of the shell polymer may be used in an amount in a range of from about 4.0 weight percent to about 4.5 weight percent based on the total weight of the polymer composition.

In one embodiment, the optional co-surfactant employed in the formation of the shell polymer may include an alcohol or a polyol. Suitable examples of the optional co-surfactant employed in the formation of the core polymer may include propyleneglycol, cremphor RH40, ethylene glycol, ethanol, 1-butanol, isopropanol, glycerol, polyethylene glycol (PEG600, PEG400), and the like In various embodiments, the optional co-surfactants and their amounts employed in the core polymer and shell polymer may be the same or different.

In one embodiment, the co-surfactant employed in the formation of the shell polymer may be used in an amount in a range of from about 0 weight percent to about 4.0 weight percent based on the total weight of the polymer composition. In another embodiment, the co-surfactant employed in the formation of the shell polymer may be used in an amount in a range of from about 0.5 weight percent to about 3.5 weight percent based on the total weight of the polymer composition. In yet another embodiment, the co-surfactant employed in the formation of the shell polymer may be used in an amount in a range of from about 0.75 weight percent to about 3.0 weight percent based on the total weight of the polymer composition. In one embodiment, the co-surfactant employed in the formation of the shell polymer may be used in an amount in a range of from about 1.0 percent to about 1.5 weight percent based on the total weight of the polymer composition.

In one embodiment, the surfactant used in the core polymer or in the shell polymer may include a non-ionic surfactant. Suitable examples include but are not limited to compounds of sodium polyoxyethylene alkyl phenyl sulfonate.

The dispersing agent used herein is either a non-surface active polymer or a surface-active substance added to a suspension, usually a colloid, to improve the separation of particles and to prevent settling or clumping. In one embodiment, the dispersing agent employed in the formation of the core and/or shell polymer is useful as known to one skilled in the art. Suitable examples include but are not limited to polyvinylalcohol.

In one embodiment, the dispersing agent used in the process of forming the core polymer of the polymer composition may be present in an amount in a range of from about 0.001 weight percent to about 1 weight percent based on the total weight of the polymer composition. In another embodiment, the dispersing agent used in the process of forming the core polymer of the polymer composition may be present in an amount in a range of from about 0.05 weight percent to about 0.6 weight percent based on the total weight of the monomer mixture. In yet another embodiment, the dispersing agent used in the process of forming the core polymer of the polymer composition may be present in an amount in a range of from about 0.20 weight percent to about 0.30 weight percent based on the total weight of the monomer mixture.

In one embodiment, the dispersing agent used in the process of forming the shell polymer of the polymer composition may be present in an amount in a range of from about 0.001 weight percent to about 1 weight percent based on the total weight of the polymer composition. In another embodiment, the dispersing agent used in the process of forming the shell polymer of the polymer composition may be present in an amount in a range of from about 0.05 weight percent to about 0.6 weight percent based on the total weight of the monomer mixture. In yet another embodiment, the dispersing agent used in the process of forming the shell polymer of the polymer composition may be present in an amount in a range of from about 0.20 weight percent to about 0.30 weight percent based on the total weight of the monomer mixture.

After the addition of the initiators and the polymerization of the monomers, residual monomers, particularly acrylonitrile and styrene, may be removed by the addition of post polymerization monomer reduction initiator. In one embodiment, the post polymerization monomer reduction initiator may include another set of redox initiators comprising a mixture of from about 0.1 weight percent to about 2.0 weight percent of a reducing agent such as erythorbic acid and from about 0.1 weight percent to about 1.0 weight percent of an oxidizing agent such as a peroxide, such as, for example, tert-butyl hydroperoxide based on the weight of the polymer composition. The reducing agent is an optional post polymerization monomer reduction initiator. In certain embodiments a peroxide without a reducing agent may be used or a second application of the redox initiator system may be used.

To further reduce the least reactive residual monomer, an additional charge of a more reactive monomer may be added prior to beginning the feed of the post polymerization monomer reduction initiators. Such addition of a more reactive monomer serves to plasticize the existing polymer particles thereby making the less reactive residual monomer more soluble in the existing polymer. Also, the more reactive monomer starts new polymer chains which are more reactive than chains begun with the less reactive monomer. For example, to reduce the amount of residual acrylonitrile, a more reactive monomer, preferably styrene, is added prior to beginning the feed of the post polymerization monomer reduction initiators. In one embodiment, styrene may be added in an amount in a range of from about 0.1 weight percent to about 1 weight percent. In another embodiment, about 0.5 weight percent of styrene may be added. This may allow both styrene and acrylonitrile to be reduced to below detectable levels, that is, below approximately 10 ppm. However, the addition of the more reactive monomer is optional. It has been found that this post polymerization monomer reduction system reduces the residual acrylonitrile from about 1.5 weigh percent to under 10 ppm, and styrene may be reduced from about 0.5 weight percent to under 10 ppm. As a result of the post polymerization monomer reduction system, the residual monomer is polymerized.

In another embodiment is provided a process for preparation of a polymer composition. The process includes a step A of forming a core polymer followed by a step B of forming a shell polymer over the core polymer. The process under step A includes the following steps:

(i) forming a first mixture including a surfactant, an optional co-surfactant, an optional dispersing agent, an optional chelating agent, an optional activator, and water;

(ii) heating the first mixture at a temperature in a range of from about 50 degree Celsius to about 100 degree Celsius to form a second mixture;

(iii) cooling the second mixture to a temperature in a range of from about 25 degrees Celsius to about 45 degrees Celsius;

(iv) forming a third mixture comprising monomers having structural units having Formula I, Formula II, and Formula VI:

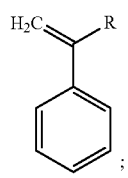
(I)

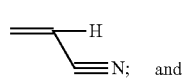
(II)

-continued

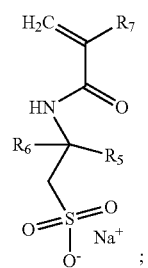
(VI)

and a monomer selected from a group consisting of monomers having a Formula III and Formula IV:

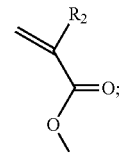
(III)

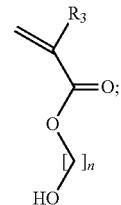
(IV)

(v) forming an aqueous initiator solution comprising a first aqueous initiator;

(vi) adding a partial quantity of the third mixture and the aqueous initiator solution to the second mixture, a monomer having Formula V (optional), and an optional emulsion stabilizer to form a fourth mixture;

(vii) homogenizing the fourth mixture to form a homogenized fourth mixture;

(viii) heating the homogenized fourth mixture to form a fifth mixture comprising the core polymer;

B. a Step B of forming a shell polymer over the core polymer comprising:

(ix) forming an active ingredient solution comprising a first active ingredient and an optional chelating agent;

(x) adding the active ingredient solution to the fifth mixture to form a sixth mixture;

(vii) preparing a seventh mixture (feed 1) comprising a monomer selected from a group consisting of monomers having a Formula III and a Formula IV:

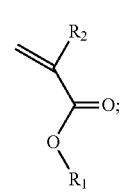
(III)

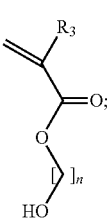

(IV)

and a second active ingredient; a cross-linker; and an optional organic initiator; wherein the second active ingredient is same as or different from the first active ingredient;

wherein $R_1$ is hydrogen or an aliphatic group having 1 to 4 carbon atoms; $R_2$ is an aliphatic group having 1 to 4 carbon atoms, $R_3$ is an aromatic group selected from the groups consisting of benzyl, methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; and "n" is an integer having a value of 1 to 4;

(viii) adding the seventh mixture to the remaining quantity of the third mixture;

(ix) preparing an eighth mixture (feed 2) comprising a second aqueous initiator, an optional surfactant, an optional co-surfactant, an optional dispersing agent, an optional emulsifier, and water (ix) adding the seventh mixture (feed 1) and the eighth mixture (feed 2) to the sixth mixture to form a ninth mixture;

(x) heating the ninth mixture to form a mixture comprising an aqueous dispersion of the polymer composition;

(xi) subjecting the tenth mixture to evaporation to form a concentrate;

(xii) providing a thermal treatment to the concentrate to form a polymer composition in an emulsion form;

(xiii) mixing the emulsion form with hydrophilic fumed silica to form a past form of the polymer composition; and (xiv) drying the paste form of the polymer composition to form a powder form of the polymer composition.

Thus once the reaction is complete an aqueous dispersion of the polymer particles is obtained. The aqueous dispersion may be converted into a powder form by using hydrophilic fumed silica. The powder form comprises polymeric dyed particles surrounded by fine particles of silica, alumina, and surfactants, and contains the active ingredients Suitable examples of hydrophilic fumed silica include but are not limited to Aerosil a-200, Aerosil 130, Aerosil 130V, Aerosil 150, Aerosil 150V, and Aerosil 300/30.

In one embodiment, the hydrophilic fumed silica used in the process of forming a powder form of the polymer composition may be present in an amount in a range of from about 1 weight percent to about 50 weight percent based on the total weight of the isolated polymer composition. In another embodiment, the hydrophilic fumed silica used in the process of forming a powder form of the polymer composition may be present in an amount in a range of from about 5 weight percent to about 25 weight percent based on the total weight of the isolated polymer composition. In yet another embodiment, the hydrophilic fumed silica used in the process of forming a powder form of the polymer composition may be present in an amount in a range of from about 10 weight percent to about 20 weight percent based on the total weight of the isolated polymer composition.

Temperatures at which and period of time for which the additions of reactants and the reactions were carried out were determined based on the reactants and the reactions and are evident from the Examples. One skilled in the art may be able to determine the temperature and time based on the reactants and reactions.

EXAMPLES

Example 1(A): Preparation of a Polymeric Composition

A polymeric composition was prepared in a 1000 ml 5-necked round-bottom flask. The flask was equipped with a reflux condenser, a stainless steel stirrer, a sampling device, and two separate inlets for feed streams inlet 1 and inlet 2.

Step A: Preparation of Core Polymer:

Freshly distilled water (300 grams (g)) with resistivity of about 18 mega Ohms centimeters, ammonium lauryl sulfate (10 g) and polyvinyl alcohol (0.2 g) was transferred into the flask to form a first mixture. The first mixture was heated to about 80 degrees Celsius under stirring at about 50 revolutions per minute (rpm) for about 30 minutes to form a second mixture. The second mixture was then allowed to cool to a temperature of about 30 degrees Celsius. A third mixture was prepared by mixing styrene (53.3 g), acrylonitrile (45.7 g), and 2-hydroxyethyl methacrylate (39.3 g). An aqueous initiator solution (7.5 g) was prepared by dissolving ammonium per sulfate (0.2356 g) and ferrous sulfate (0.0144 g) in DM water (7.249 g).

A partial quantity of the third mixture (12 g), sodium salt of 2-acrylamido-2-methylpropane sulfonic acid (6.6 g), and the aqueous initiator solution were added to the second mixture in the round bottom flask to form a fourth mixture. The fourth mixture was then homogenized using an ultrasonic vibration in an ultrasonic bath under stirring at a speed of about 50 rpm for about 40 minutes. During ultra-sonic vibration, temperature of the fourth mixture was found to increase from a temperature of about 30 degrees Celsius to a temperature of about 40 degrees Celsius. After completion of the ultrasonic vibration a homogenized fourth mixture was obtained. The homogenized fourth mixture was first heated to a temperature of about 40 degrees Celsius and maintained at 40 degrees Celsius for about four hours. The temperature was then increased to about 50 degrees Celsius and maintained at 50 degrees Celsius for two hours to form the fifth mixture including the core polymer.

Step B: Forming the Shell Polymer Over the Core Polymer to Obtain the Polymer Composition:

An active ingredient solution was prepared using Basic Red 1:1 (0.78 g), Basic Violet 11:1 (0.5 g), methanol (3 g), and sodium salt of ethylene diamine tetra acetic acid (0.1 g) in DM water (20 g). The active ingredient solution was charged into the fifth mixture including the core polymer under stirring. The resultant mixture was stirred for about 12 hours at a temperature of about 30 degrees Celsius to form a sixth mixture. The temperature of the sixth mixture was increased to about 70 degrees Celsius.

A seventh mixture (feed 1) was prepared by adding Basic Red 1:1 (1.17 g), Basic Violet 11:1 (0.75 g), 3-chloro-2-hydroxypropyl methacrylate (3.5 g), glycidyl methacrylate (1.0 g) and trimethylolpropane trimethacrylate (12.0 g) to the remaining quantity of the third mixture (126.3 g). The seventh mixture was added to the sixth mixture at a rate of about 17.85 grams per hour under atmospheric conditions in a time period of about 8 hours through inlet 1.

Feed 2 was prepared and added in 8 aliquots over a period of 8 hours. A first aliquot of an eighth mixture (feed 2a) was prepared by dissolving ammonium persulfate (0.2356 g) and ferrous sulfate (0.0144 g) in DM water (7.249 g). The first aliquot was added over a period of about 1 hour to the sixth mixture. In a similar manner a second feed 2b, a third feed 2c, a fourth feed 2d, and a fifth feed 2e aliquot were prepared using ammonium persulfate (0.2356 g) and ferrous sulfate (0.0144 g) in DM water (7.249 g) and these second to fifth aliquots were added to the sixth mixture every hour for another four hours. For the next 3 hours 3 separate aliquots were prepared and added through inlet 2. A sixth aliquot feed 2f: ammonium persulfate (0.268 g), and ferrous sulfate (0.0164 g) in DM water (7.215 g); a seventh aliquot: feed 2g ammonium persulfate (0.3107 g), and ferrous sulfate (0.0191 g) in DM water (7.170 g); an eighth aliquot feed 2h: ammonium persulfate (0.4560 g) and ferrous sulfate (0.028 g) in DM water (7.015 g)

Feed 1 and Feed 2 were added simultaneously to the sixth mixture over a period of 8 hours while maintaining the temperature of the mixture in the flask at about 70 degrees Celsius to obtain a ninth mixture. The resultant ninth mixture was heated for an additional 2 hours at a temperature of about 70 degrees Celsius to form an eleventh mixture. Aqueous fluorescent dispersion containing pink colored resin particles having a core-shell configuration was obtained.

Example 1 (B): Preparation of a Polymer Composition

Step A and Step B were carried out in a similar manner as described in Example 1(A). A few variations made in Example 1(B) are mentioned herein.
Step A: Variations in Preparation of Core Polymer:

The heat treatment provided to the homogenized fourth mixture in Example 1(B) is different from that provided in Example 1(A). The homogenized fourth mixture in Example 1(B) was heated to a temperature of about 70 degrees Celsius within a time period of about 30 minutes and maintained at 70 degrees Celsius for a time period of about 40 minutes to form a fifth mixture including the core polymer.
Step B: Variations in Forming the Shell Polymer Over the Core Polymer to Obtain the Polymer Composition:

3-chloro-2-hydroxypropyl methacrylate (3.5 g), glycidyl methacrylate (1.0 g) and trimethylolpropane trimethacrylate (12.0 g) were not used in the preparation of the seventh mixture in Step B. The seventh mixture (feed 1) was prepared by adding Basic Red 1:1 (1.17 g) and Basic Violet 11:1 (0.75 g) to the remaining quantity of the third mixture (142.8 g). An active ingredient solution was prepared using Basic Red 1:1 (0.78 g), Basic Violet 11:1 (0.5 g), methanol (3.0 g) and sodium salt of ethylenediaminetetraacetic acid (0.1 g) in DM water (20.0 g). The active ingredient solution was charged into the fifth mixture including the core polymer and stirring was continued for about 30 minutes to form the sixth mixture. A seventh mixture (Feed 1) and an eighth mixture Feed 2 were prepared in a similar manner as specified in Example 1(A) and added simultaneously to the sixth mixture over a period of 8 hours while maintaining the temperature of the mixture in the flask at about 70 degrees Celsius to obtain a ninth mixture. The seventh mixture (feed 1) was added to the sixth mixture at a rate of about 16.02 grams per hour. At the end of the reaction aqueous fluorescent dispersion containing pink colored particles was obtained (tenth mixture).

Example 1 (C): Preparation of a Polymer Composition

The polymer composition was prepared in a manner similar to that as discussed in Example 1(A). A few variations made in Example 1(C) are mentioned herein.
Step A: Variations in Preparation of Core Polymer:

The first mixture used in Example 1(C) includes Sodium lauryl sulfate (4 g) as emulsifying agent in place of ammonium lauryl sulfate. The heat treatment provided to the homogenized fourth mixture in Example 1(C) is different from that provided in Example 1(A). The homogenized fourth mixture in Example 1(C) was heated to a temperature of about 70 degrees Celsius within a time period of about 30 minutes and maintained at 70 degrees Celsius for a time period of about 40 minutes to form a fifth mixture including the core polymer.
Step B: Variations in Forming the Shell Polymer Over the Core Polymer to Obtain the Polymer Composition:

The seventh mixture (feed 1) was prepared by adding 3-chloro-2-hydroxypropyl methacrylate (3.5 g), glycidyl methacrylate (1.0 g), Basic Red 1:1 (1.17 g) and Basic Violet 11:1 (0.75 g) to the remaining quantity of the third mixture (142.8 g). Trimethylolpropane trimethacrylate was not used in the preparation of the seventh mixture in Step B. The eighth mixture (Feed 2) was prepared and added to the sixth mixture in a similar manner as described above for example A simultaneously with Feed 1 over a period of 8 hours in a while maintaining the temperature of the mixture in the flask at about 70 degrees Celsius to obtain a ninth mixture. The seventh mixture (feed 1) was added at a rate of 16.5 grams per hour in a period of 8 hours. The resultant ninth mixture was heated for an additional 2 hours at a temperature of about 70 degrees Celsius to form a tenth mixture. Aqueous fluorescent dispersion containing pink colored resin particles having a core-shell configuration was obtained.

Example 1 (D): Preparation of a Dyestuff Composition

The polymer composition was prepared in a manner similar to that as discussed in Example 1(A). A few variations made in Example 1(D) are mentioned herein.
Step A: Variations in Preparation of Core Polymer:

Core polymer was prepared in a similar manner as described in Example 1(A). Except in that: (i) in the fourth mixture the amount of sodium salt of 2-acrylamido-2-methylpropane sulfonic acid was increased to 15 g instead of the 6.6 g used in Example 1(A); and (ii) The aqueous initiator system (8 g) was prepared by dissolving ammonium persulfate (0.35 g) and ferrous sulfate (0.08 g) in DM water (40 g). The heat treatment provided to the homogenized fourth mixture in Example 1(D) is different from that provided in Example 1(A). The homogenized fourth mixture in Example 1(D) was heated to a temperature of about 70 degrees Celsius within a time period of about 30 minutes and maintained at 70 degrees Celsius for a time period of about 40 minutes to form a fifth mixture including the core polymer.
Step B: Variations in Forming the Shell Polymer Over the Core Polymer to Obtain the Polymer Composition:

Shell polymer was prepared in the same manner as described in Example 1(A) above to provide an aqueous fluorescent dispersion containing pink colored resin particles having a core-shell configuration.

Example 1 (E): Preparation of a Polymer Composition

Step A and Step B in Example 1(E) were similar to that as described with reference to Example 1(A). One variation that was introduced in Example 1(E) was that 3-hydroxypropyl methacrylate was used instead of 2-hydroxyethyl methacrylate.

Example 1 (F): Preparation of a Polymer Composition

Step A and Step B in Example 1(E) were similar to that as described with reference to Example 1(A). One variation that was introduced in Example 1(E) was that in Step B the active ingredient solution was neither prepared nor used. The other variation was in the seventh mixture (Feed 1) where an optical brightener 2,5-Bis(5-methyl-benzoxazol)-ethene, Purity—98 percent (3.2 g) was used instead of Basic Red 1:1 and Basic Violet 11:1. The feed 1 was added to the sixth mixture at a rate of about 20.2 grams per hour. Aqueous fluorescent dispersion containing OB particles were obtained.

Example 2 (A): Preparation of a Polymer Composition

Step A and Step B were carried out in a similar manner as described in Example 1(A). Variations were introduced in Step B. The variations included (i) Active ingredient solution was prepared using Solvent violet 13 (0.056 g) and Basic Violet 11:1 (1.22 g), methanol (3.0 g), and sodium salt of ethylenediaminetetraacetic acid (0.1 g) in DM water (20.0 g); (ii) The seventh mixture (feed 1) was prepared by adding Solvent Violet 13 (0.084 g) and Basic Violet 11:1 (1.83 g), 3-chloro-2-hydroxypropyl methacrylate (3.5 g), glycidyl methacrylate (1.0 g), and trimethylolpropane trimethacrylate (12.0 g) to the remaining quantity of the third mixture (126.3 g). (iii) the Feed 1 was added at a rate of about 17.8 grams per hour over 8 hours to the sixth mixture. (iv).

Feed 2 was prepared and added in 8 aliquots over a period of 8 hours. A first aliquot of an eighth mixture (feed 2a) was prepared by dissolving ammonium persulfate (0.1897 g) and ferrous sulfate (0.0116 g) in DM water (7.298 g). The first aliquot was added over a period of about 1 hour to the sixth mixture. In a similar manner a second feed 2b, a third feed 2c, a fourth feed 2d, and a fifth feed 2e aliquot were prepared using ammonium persulfate (0.1897 g) and ferrous sulfate (0.0116 g) in DM water (7.298 g) and these second to fifth aliquots were added to the sixth mixture every hour for another four hours. For the next 3 hours 3 separate aliquots were prepared and added through inlet 2. A sixth aliquot feed 2f: ammonium persulfate (0.2102 g) and ferrous sulfate (0.0129 g) in DM water (7.2768 g); a seventh aliquot feed 2g: ammonium persulfate (0.2356 g) and ferrous sulfate (0.0144 g) in DM water (7.249 g); an eighth aliquot feed 2h: ammonium persulfate (0.3695 g) and ferrous sulfate (0.0227 g) in DM water (7.107 g). At the end of the reaction an aqueous fluorescent dispersion containing magenta colored particles was obtained.

Example 2 (B): Preparation of a Polymer Composition

Step A and Step B were carried out in a similar manner as described in Example 1(A). Variations were introduced in Step A and Step B.

Step A: Variations in Preparation of Core Polymer:
The first mixture was prepared using DM water (320 g), ammonium lauryl sulfate (9.6 g) and Triton™ X-405 (1.0 g). A third mixture was prepared using styrene (53.3 g), acrylonitrile (56.4 g) and 2-hydroxyethyl methacrylate (56.4 g), sodium salt of 2-acrylamido-2-methylpropane sulfonic acid (7.0 g). An aqueous initiator solution (8.0 g) was prepared by dissolving ammonium per sulfate (0.2513 g) and ferrous sulfate (0.1536 g) in DM water (7.732 g). A fourth mixture was formed by mixing a partial quantity (12.8 g) of the third mixture and the aqueous initiator solution.

Step B: Variations in Forming the Shell Polymer Over the Core Polymer to Obtain the Polymer Composition:
An active ingredient solution was prepared using Basic Red 1:1 (0.22 g) and Basic Violet 11:1 (1.71 g), methanol (3.0 g) and sodium salt of ethylenediaminetetraacetic acid (0.1 g), and DM water (20.0 g). The seventh mixture (feed 1) was prepared in different portions as against a single seventh mixture as prepared in Example 1(A): Seventh mixture (feed 1) was prepared and added in several steps in this Example 2(B).

(1) First step: A portion of seventh mixture Feed 1 was prepared by adding Basic Violet 11:1 (2.57 g) to the remaining quantity of the third mixture (153.5 g) to provide a resultant mixture of the first step i.e., feed 1a.

(2) Second step: From Feed 1a 39.01 g was taken and Basic Red 1:1 (0.35 g) was added to this portion of Feed 1a (39.01 g). The resultant mixture of second step i.e., feed 1b (39.36 g) was added at a rate of about 19.68 g per hour to the sixth mixture in the first 2 hours of the total 8 hour addition of feed 1 (as described in the earlier examples)

(3) Third step: from Feed 1a remaining 117.06 g was taken and Solvent Violet 13 (0.169 g) was dissolved to this portion of feed 1a 117.06 g to give a resultant mixture (117.229 g). From the resultant mixture i.e., 117.229 g, 39.01 g was taken and Basic Red 1:1 (0.34 g) was added to this portion of 39.01 g. The resultant mixture of third step i.e., feed 1c (39.35 g) was added at a rate of about 19.67 grams per hour to the sixth mixture in the next 2 hours of the total 8 hour addition of feed 1 (as described in the earlier examples)

(4) Fourth step: The remaining Feed 1a 77.9 g was then added at a rate of about 19.5 grams per hour to the sixth mixture in the next 4 hours of the total 8 hour addition of feed 1 (as described in the earlier examples)

Feed 2 was prepared and added in 8 aliquots over a period of 8 hours. A first aliquot of an eighth mixture (feed 2a) was prepared by dissolving ammonium persulfate (0.2513 g) and ferrous sulfate (0.1536 g) in DM water (7.732 g). The first aliquot was added over a period of about 1 hour to the sixth mixture. In a similar manner a second feed 2b, a third feed 2c, a fourth feed 2d, and a fifth feed 2e aliquot was prepared every hour using ammonium persulfate (0.2513 g) and ferrous sulfate (0.1536 g) in DM water (7.732 g) and these second to fifth aliquots were added to the sixth mixture every hour for another four hours. For the next 3 hours 3 separate aliquots were prepared and added through inlet 2. A sixth aliquot feed 2f: ammonium persulfate (0.1877 g) and ferrous sulfate (0.0115 g) in DM water (7.8 g); a seventh aliquot feed 2g: ammonium persulfate (0.1693 g) and ferrous sulfate (0.0104 g) in DM water (7.819 g); and an eighth aliquot feed 2h ammonium persulfate (0.1543 g) and ferrous sulfate (0.00949 g) in DM water (7.835 g) 2. At the end of the reaction an aqueous fluorescent dispersion containing magenta colored having a core-shell configuration was obtained.

Example 3: Preparation of a Polymer Composition

Step A and Step B were carried out in a similar manner as described in Example 1(A). Variations introduced in Step A and Step B are described below:

Step A Variations: Preparation of Core Polymer:

In the first mixture the quantity of water was increased to 320 g. A third mixture was prepared using styrene (51.5), acrylonitrile (54.6) and 2-hydroxyethyl methacrylate (54.6), and sodium salt of 2-acrylamido-2-methylpropane sulfonic acid (7 g). A fourth mixture was formed by adding a partial quantity (12.8 g) of the third mixture and Carbopol™ 940 (2.6 g). An aqueous initiation system (8.0) was prepared by dissolving ammonium persulfate (0.2513 g) and ferrous sulfate (0.0154 g) in DM water (7.7332 g).

Step B Variations: Forming the Shell Polymer Over the Core Polymer to Obtain the Polymer Composition:

An active ingredient solution was prepared by adding Basic Red 1:1 (0.29 g) and Basic Violet 11:1 (1.96 g), methanol (3 g) and sodium salt of ethylenediaminetetraacetic acid (0.1 g) to DM water (20 g). The seventh mixture Feed 1 was prepared by adding Basic Red 1:1 (0.45 g), Basic Violet 11:1 (2.95 g), 3-chloro-2-hydroxypropyl methacrylate (3.5 g), glycidyl methacrylate (1.0 g) and trimethylolpropane trimethacrylate (5.6 g) to the remaining quantity of the third mixture (147.9 g). The seventh mixture Feed 1 was added to the sixth mixture at a flow rate of about 13.16 grams per hour over a period of 12 hours. Feed 2 was prepared and added in 12 aliquots over a period of 12 hours. A first aliquot of an eighth mixture (feed 2a) was prepared by dissolving ammonium persulfate (0.2513 g) and ferrous sulfate (0.0154 g) in DM water (7.7332 g). The first aliquot was added over a period of about 1 hour to the sixth mixture. In a similar manner a second feed 2b, a third feed 2c, a fourth feed 2d, a fifth feed 2e, a sixth feed 2f, a seventh feed 2g, an eighth feed 2h, and a ninth feed 2i aliquot was prepared every hour using ammonium persulfate (0.2513 g) and ferrous sulfate (0.0154 g) in DM water (7.7332 g) and these second to ninth aliquots were added to the sixth mixture every hour for another 8 hours. For the next 3 hours 3 separate aliquots were prepared and added through inlet 2. A tenth aliquot feed 2j: ammonium persulfate (0.1877 g) and ferrous sulfate (0.0115 g) in DM water (7.836 g); a eleventh feed 2k ammonium persulfate (0.1694 g) and ferrous sulfate (0.0104 g) in DM water (7.820 g); a twelfth feed 2k ammonium persulfate (0.1543 g) and ferrous sulfate (0.00949 g) in DM water (7.836 g). The Feed 1 and Feed 2 are added over a period of about 12 hours. The rest of the reaction was the same as described with reference to Example 1(A). Aqueous fluorescent dispersion containing rose colored particles having a core-shell configuration was obtained.

Example 4 (A): Preparation of a Polymer Composition

Step A and Step B were carried out in a similar manner as described in Example 1(A). Variations introduced in Step A and Step B are described below:

Step A Variations: Preparation of Core Polymer:

Water (200 g), ammonium lauryl sulfate (1.5 g), polyvinyl alcohol (0.2 g) was used in the preparation of the first mixture. The heating provided to the homogenized fourth mixture in Example 4(A) is different from that provided in Example 1(A). The homogenized fourth mixture in Example 4(A) was heated to a temperature of about 70 degrees Celsius within a time period of about 30 minutes and maintained at 70 degrees Celsius for a time period of about 40 minutes to form a fifth mixture including the core polymer.

Step B Variations: Forming the Shell Polymer Over the Core Polymer to Obtain the Polymer Composition:

An active ingredient solution was prepared by homogenizing a mixture formed by mixing ammonium lauryl sulfate (6.5 g) and Triton™ X-405 (1.0 g), Basic Red 1:1 (0.46 g), Basic Yellow 40 (3.68 g), methanol (3.0 g), sodium salt of ethylenediaminetetraacetic acid (0.1 g) and water (100.0 g). The active ingredient solution was added to the fifth mixture over a period of 8 hours. The rate of addition was maintained at about 10.3 grams per hour for the first five hours and then was increased to 13.3 g per hour, 16.3 g per hour, and 19.3 g per hour for the 6th, 7th, and 8th hours respectively to form the sixth mixture. The seventh mixture (feed 1) was prepared by adding 3-chloro-2-hydroxypropyl methacrylate (3.5 g), glycidyl methacrylate (1.0 g), and trimethylolpropane trimethacrylate (5.6 g) to the remaining quantity of the third mixture (126.3). The seventh mixture was added to the sixth mixture at a flow rate of about 16.3 g per hour. Feed 2 was prepared and added in 8 aliquots over a period of 8 hours. A first aliquot of an eighth mixture (feed 2a) was prepared by dissolving ammonium persulfate (0.1729 g) and ferrous sulfate (0.0106 g) in DM water (7.3164 g). The first aliquot was added over a period of about 1 hour to the sixth mixture. In a similar manner a second feed 2b, a third feed 2c, a fourth feed 2d, and a fifth feed 2e aliquot was prepared every hour using ammonium persulfate (0.1729 g) and ferrous sulfate (0.0106 g) in DM water (7.3164 g) and these second to fifth aliquots were added to the sixth mixture every hour for another four hours. For the next 3 hours 3 separate aliquots were prepared and added through inlet 2. A sixth aliquot feed 2f: ammonium persulfate (0.1897 g) and ferrous sulfate (0.0116 g) in DM water (7.298 g); a seventh aliquot feed 2g: ammonium persulfate (0.1897 g) and ferrous sulfate (0.0116 g) in DM water (7.298 g); and eighth aliquot feed 2h ammonium persulfate (0.1897 g) and ferrous sulfate (0.0116 g) in DM water (7.298 g). The rest of the reaction was the same as described with reference to Example 1(A). Aqueous fluorescent dispersion containing chrome colored particles having a core-shell configuration was obtained.

Example 4 (B): Preparation of a Polymer Composition

Step A and Step B were carried out in a similar manner as described in Example 4(A). Variations introduced in Step B are described below:

Step B Variations: Forming the Shell Polymer Over the Core Polymer to Obtain the Polymer Composition:

An active ingredient solution was prepared by homogenizing a mixture formed by mixing ammonium lauryl sulfate (6.5 g) and Triton X-405 (1.0 g), Basic Red 1:1 (0.46 g), Basic Violet 11 (0.038 g), Basic Yellow 40 (3.68 g), methanol (3.0 g), sodium salt of ethylenediaminetetraacetic acid (0.1 g) and water (100.0 g). The seventh mixture (feed 1) was prepared by adding 3-chloro-2-hydroxypropyl methacrylate (3.5 g) and glycidyl methacrylate (1.0 g) to the remaining quantity of the third mixture. Trimethylolpropane trimethacrylate was not used in the seventh mixture. The rest of the reaction was the same as described with reference to Example 4(A), Aqueous fluorescent dispersion containing chrome colored particles having a core-shell configuration was obtained.

Example 5: Preparation of a Polymer Composition

Step A and Step B were carried out in a similar manner as described in Example 1(A). Variations introduced in Step A and Step B are described below:

Step A Variations: Preparation of Core Polymer:

A first mixture was prepared by mixing ammonium lauryl sulfate (2.5 g), polyvinyl alcohol (1.0 g), and water (400 g). A third mixture was prepared by mixing acrylonitrile (9 g), methyl methacrylate (21 g), benzyl methacrylate (21 g) and 3-chloro-2-hydroxypropyl methacrylate (9 g). An aqueous initiator solution was prepared by dissolving ammonium per sulfate (0.75 g) and ferrous sulfate (0.08 g) in DM water (20.0 g). The fourth mixture was formed by transferring a partial quantity (12 g) of the third mixture and the aqueous initiator solution into the round bottom flask containing the first mixture. The temperature of the reaction mixture was then increased to about 70 degrees Celsius under stirring over a period of about 30 minutes and maintained at about 70 degrees Celsius over a period of about 60 minutes to form the fifth mixture including the core polymer.

Step B Variations: Forming the Shell Polymer Over the Core Polymer to Obtain the Polymer Composition:

An active ingredient solution was prepared by adding Basic Red 1:1 (0.8416 g), Basic Violet 11 (0.2103 g), methanol (3.0 g) and sodium salt of ethylene diamine tetra acetic acid (0.1 g) in DM water (20.0 g). The active ingredient solution was then titrated slowly with water (100 g) containing ammonium lauryl sulfate (5.0 g) under continuous stirring over a period of 60 minutes to provide a fluorescent dye solution. The fluorescent dye solution was added to the fifth mixture over a period of about 90 minutes to provide the sixth mixture. The seventh mixture (feed 1) in Example 5 is the remaining quantity of the third mixture. The seventh mixture was added to the sixth mixture at a rate of about 24 g per hour in a period of about 8 hours. The eighth mixture (Feed 2, aqueous initiator solution) was prepared by dissolving ammonium persulfate (0.75 g) and ferrous sulfate (0.08 g) in DM water (20.0 g). The eighth mixture was added to the sixth mixture over a period of about 2 hours. After completion of 2 hours at a temperature of about 70 degrees Celsius, the reaction was further continued at a temperature of about 70 degrees Celsius for an additional 4 hours. The rest of the reaction was the same as described with reference to Example 1(A). Aqueous fluorescent dispersion containing pink colored particles having a core-shell configuration was obtained.

Example 6: Preparation of a Polymer Composition

Step A and Step B were carried out in a similar manner as described in Example 1(A). Variations introduced in Step A and Step B are described below:

Step A Variations: Preparation of Core Polymer:

A first mixture was prepared by mixing freshly distilled water (200 g), ammonium lauryl sulfate (1.5 g) and polyvinyl alcohol (0.2 g). The first mixture was stirred at a temperature of about 80 degrees Celsius for about 30 minutes under nitrogen atmosphere and then allowed to cool to a temperature of about 30 degrees Celsius to form a second mixture. The temperature of the reaction mixture was then increased to about 70 degrees Celsius under agitation using ultrasonic vibrations, over a period of about 30 minutes and maintained at about 70 degrees Celsius over a period of about 60 minutes to form the fifth mixture including the core polymer.

Step B Variations: Forming the Shell Polymer Over the Core Polymer to Obtain the Polymer Composition:

An active ingredient solution was prepared using ammonium lauryl sulfate (6.5 g) and Triton X-405 (1.0 g) in DM water (80 g) being titrated against aqueous solution containing Basic Yellow 40 (3.2 g), methanol (3 g) and sodium salt of ethylenediaminetetraacetic acid (0.1 g) in DM water (20 g). The active ingredient solution was added to the fifth mixture and the resultant stirred for about 60 minutes to form the sixth mixture. A partial quantity of the active ingredient solution (40 g) was added to the fifth mixture over a time period of about 30 minutes. The remaining quantity (73.8 g) of the active ingredient solution was added to the fifth mixture over a time period of about 8 hours. The seventh mixture (feed 1) in Example 7 was prepared by adding 3-chloro-2-hydroxypropyl methacrylate (3.5 g), glycidyl methacrylate (1.0 g), and trimethylolpropane trimethacrylate (10.0 g) to the remaining quantity of third mixture (126.3 g). The seventh mixture was added to the sixth mixture at a rate of about 17.65 g per hour under atmospheric conditions in a period of about 8 hours. Feed 2 was prepared and added in 8 aliquots over a period of 8 hours. A first aliquot of an eighth mixture (feed 2a) was prepared by dissolving ammonium persulfate (0.1730 g) and ferrous sulfate (0.0106 g) in DM water (7.3164 g). The first aliquot was added over a period of about 1 hour to the sixth mixture. In a similar manner a second feed 2b, a third feed 2c, a fourth feed 2d, and a fifth feed 2e aliquot was prepared every hour using ammonium persulfate (0.1729 g) and ferrous sulfate (0.0106 g) in DM water (7.3164 g) and these second to fifth aliquots were added to the sixth mixture every hour for another four hours. For the next 3 hours 3 separate aliquots were prepared and added through inlet 2. A sixth aliquot feed 2f: ammonium persulfate (0.1897 g) and ferrous sulfate (0.0116 g) in DM water (7.298 g); a seventh aliquot feed 2g: ammonium persulfate (0.2102 g) and ferrous sulfate (0.0129 g) in DM water (7.276 g); and an eighth aliquot feed 2h: ammonium persulfate (0.3107 g) and ferrous sulfate (0.0191 g) in DM water (7.170 g) through inlet 2. Feed 1 and Feed 2 were added simultaneously to the sixth mixture over a period of 8 hours while maintaining the temperature of the mixture in the flask at about 70 degrees Celsius to obtain a ninth mixture. The resultant ninth mixture was heated for an additional 2 hours at a temperature of about 70 degrees Celsius to form a tenth mixture. Aqueous fluorescent dispersion containing yellow colored resin particles having a core-shell configuration was obtained.

Example 7: Preparation of a Polymer Composition

Step A and Step B were carried out in a similar manner as described in Example 1(A). Variations introduced in Step A and Step B are described below:

Step A Variations: Preparation of Core Polymer:

Freshly distilled water (320 grams (g)) with resistivity of about 18 mega Ohms centimeters, ammonium lauryl sulfate (10 g) and polyvinyl alcohol (0.2 g) was transferred into the flask to form a first mixture. A third mixture was prepared by mixing the monomers of styrene (51.5 g), acrylonitrile (54.6 g), and 2-hydroxyethyl methacrylate (54.6 g). An aqueous initiator solution (8.0 g) was prepared by dissolving ammonium per sulfate (0.2413 g) and ferrous sulfate (0.01546 g) in DM water (7.733 g). A partial quantity of the third mixture (12 g), sodium salt of 2-acrylamido-2-methylpropane sulfonic acid (7 g), Carbapol™ (2.67 g) and the aqueous initiator solution were added to the second mixture in the round bottom flask to form a fourth mixture. The fourth mixture was subjected to ultra-sonic vibration as discussed with reference to Example 1(A) above.

Step B Variations: Forming the Shell Polymer Over the Core Polymer to Obtain the Polymer Composition:

An active ingredient solution was prepared by adding Basic Red 1:1 (1.29 g) and Basic Violet 11:1 (0.60 g), Basic Yellow 40 (0.46 g), methanol (3.0 g), and sodium salt of ethylenediaminetetraacetic acid (0.1 g) to DM water (20 g). The active ingredient solution was charged to the fifth mixture in the round bottom flask and the resultant mixture was stirred for about 12 hours to obtain the sixth mixture. A seventh mixture (feed 1) was prepared by adding Basic red 1:1 (1.93 g), Basic Violet 11:1 (0.90 g) and Basic Yellow 40 (0.69 g) to the remaining quantity of the third mixture (147.9 g). The seventh mixture was added to the sixth mixture at a rate of about 18.4 g per hour. Feed 2 was prepared and added in 8 aliquots over a period of 8 hours. A first aliquot of an eighth mixture (feed 2a) was prepared by dissolving ammonium persulfate (0.2413 g) and ferrous sulfate (0.01546 g) in DM water (7.733 g). The first aliquot was added over a period of about 1 hour to the sixth mixture. In a similar manner a second feed 2b, a third feed 2c, a fourth feed 2d, and a fifth feed 2e aliquot was prepared every hour using ammonium persulfate (0.2413 g) and ferrous sulfate (0.01546 g) in DM water (7.733 g). and these second to fifth aliquots were added to the sixth mixture every hour for another four hours. For the next 3 hours 3 separate aliquots were prepared and added through inlet 2. A sixth aliquot feed 2f: ammonium persulfate (0.1877 g) and ferrous sulfate (0.0115 g) in DM water (7.8 g); a seventh aliquot feed 2g: ammonium persulfate (0.1694 g) and ferrous sulfate (0.0104 g) in DM water (7.82 g); and an eighth feed 2h: ammonium persulfate (0.1543 g) and ferrous sulfate (0.0094 g) in DM water (7.836 g). Feed 1 and Feed 2 were added simultaneously to the sixth mixture over a period of 8 hours while maintaining the temperature of the mixture in the flask at about 70 degrees Celsius to obtain a ninth mixture. The rest of the reaction was the same as described with reference to Example 1(A). Aqueous fluorescent dispersion containing red colored resin particles having a core-shell configuration was obtained.

Example 8 (A): Preparation of a Polymer Composition

Step A and Step B were carried out in a similar manner as described in Example 1(A). Variations introduced in Step A and Step B are described below:

Step A Variations: Preparation of Core Polymer:

A first mixture was prepared by mixing ammonium lauryl sulfate (8.0 g), Triton X 405 (1.0 g), polyvinyl alcohol (0.2 g), and water (320 g). The first mixture was transferred into a round bottom flask and stirred at a temperature of about 80 degrees Celsius for about 30 minutes under a nitrogen atmosphere and allowed to cool to a temperature of about 30 degrees Celsius to form a second mixture. An aqueous initiator solution (8 g) was prepared by ammonium per sulfate (0.2413 g) and ferrous sulfate (0.0154 g) in DM water (7.733 g) and stirring the mixture at a rate of 50 rpm in an ultra-sonic bath for about 40 minutes. A third mixture was formed by mixing styrene (49.206 g), acrylonitrile (55.766 g), and 2-hydroxyethyl methacrylate (62.966 g). A fourth mixture was formed by transferring a partially quantity (12.8 g) of the third mixture, sodium salt of 2-acrylamido-2-methylpropane sulfonic acid (7 g), carbopol solution (as prepared hereinabove) (2.67 g), and the aqueous initiator solution (8 g) to the second mixture in the round bottom flask. The temperature of the reaction mixture in the flask was then increased to 70 degrees Celsius over a period of about 30 minutes and then maintained at 70 degrees Celsius for about 40 minutes to form a fifth mixture including the core polymer.

Step B Variations: Forming the Shell Polymer Over the Core Polymer to Obtain the Polymer Composition:

A seventh mixture (feed 1) was prepared by adding Basic Yellow 40 (3.42 g), Basic Red 11:1 (0.76 g), Basic violet 11:1 (0.77 g), and trimethylolpropane trimethacrylate (3.7 g) to remaining quantity of the third mixture (155.13 g). The fourth mixture was added to the sixth mixture at a rate of about 19.85 grams per hour under atmospheric conditions in a period of about 8 hours.

Feed 2 was prepared and added in 8 aliquots over a period of 8 hours. A first aliquot of an eighth mixture (feed 2a) was prepared by dissolving ammonium persulfate (0.2413 g) and ferrous sulfate (0.01546 g) in DM water (7.733 g). The first aliquot was added over a period of about 1 hour to the sixth mixture. In a similar manner a second feed 2b, a third feed 2c, a fourth feed 2d, and a fifth feed 2e aliquot was prepared every hour using ammonium persulfate (0.2413 g) and ferrous sulfate (0.01546 g) in DM water (7.733 g) and these second to fifth aliquots were added to the sixth mixture every hour for another four hours. For the next 3 hours 3 separate aliquots were prepared and added through inlet 2. A sixth aliquot feed 2f: ammonium persulfate (0.1877 g) and ferrous sulfate (0.0115 g) in DM water (7.8 g); a seventh aliquot feed 2g: ammonium persulfate (0.1694 g) and ferrous sulfate (0.0104 g) in DM water (7.82 g) and an eighth aliquot feed 2h: ammonium persulfate (0.1543 g) and ferrous sulfate (0.0094 g) in DM water (7.836 g). Feed 1 and Feed 2 were added simultaneously to the sixth mixture over a period of 8 hours while maintaining the temperature of the mixture in the flask at about 70 degrees Celsius to obtain a ninth mixture. The resultant ninth mixture was heated for an additional 2 hours at a temperature of about 70 degrees Celsius to form a tenth mixture. Aqueous fluorescent dispersion containing orange colored resin particles having a core-shell configuration was obtained.

Example 8(B): Preparation of a Polymer Composition

Step A and Step B were carried out in a similar manner as described in Example 1(A). Variations introduced in Step A and Step B are described below:

Step A Variations: Preparation of Core Polymer:

A first mixture was prepared by mixing ammonium lauryl sulfate (10.0 g), polyvinyl alcohol (0.2 g), and water (300 g). The first mixture was transferred into a round bottom flask and stirred at a temperature of about 80 degrees Celsius for about 30 minutes under a nitrogen atmosphere and allowed to cool to a temperature of about 30 degrees Celsius to form a second mixture. A third mixture was formed by mixing styrene (53.3 g), acrylonitrile (45.7 g) and 2-hydroxyethyl methacrylate (39.3 g). An aqueous initiator solution (7.5 g) was prepared by ammonium per sulfate (0.2356 g) and sodium meta bisulfite (0.0144 g) in DM water (7.249 g) and stirring the mixture at a rate of 50 rpm in an ultra-sonic bath for about 40 minutes. A fourth mixture was prepared by transferring a partial quantity (12.0 g) of the third mixture, maleic anhydride (1.5 g), methylacrylic acid (1.5 g), propylene glycol (3.5 g), and sodium salt of 2-acrylamido-2-methylpropane sulfonic acid (15.0 g), and the aqueous initiator solution to the second mixture in the round bottom flask. The temperature of the reaction mixture in the flask was then increased to 70 degrees Celsius over a period of about 30 minutes and then maintained at 70 degrees Celsius for about 40 minutes to form a fifth mixture including the core polymer.

Step B Variations: Forming the Shell Polymer Over the Core Polymer to Obtain the Polymer Composition:

Sodium salt of ethylenediaminetetraacetic acid (0.6 g) is added to the fifth mixture and temperature of the resultant mixture is raised 70 degrees Celsius to form the sixth mixture. A seventh mixture (feed 1) was prepared by adding Basic Yellow 40 (3.65 g), Basic Red 1:1 (0.65 g), Basic violet 11:1 (0.66 g), trimethylolpropane trimethacrylate (3.5 g), and glycidyl methacrylate (1.0 g) to the remaining quantity of the third mixture (126.3 g). The seventh mixture was added to the sixth mixture at a rate of about 11.3 g per hour under atmospheric conditions in a period of about 12 hours (in 12 lots). An eighth mixture (feed 2) was prepared by mixing ammonium persulfate (0.9 g), sodium metabisulfite (0.06 g) used as redox agent, polyvinylalcohol (1.8 g), ammonium lauryl sulfate (15 g), and water (40 g). The eighth mixture was added to the sixth mixture at a rate of about 4.8 g per hour over 12 hours. Tertiary butylhydroperoxide (0.75 g) was added to the twelfth and last lot of the seventh mixture and the twelfth lot was then fed into the reaction mixture in the reaction flask. Feed 1 and Feed 2 were added simultaneously to the sixth mixture over a period of 12 hours while maintaining the temperature of the mixture in the flask at about 70 degrees Celsius to obtain a ninth mixture. The resultant ninth mixture was heated for an additional 2 hours at a temperature of about 70 degrees Celsius to form a tenth mixture. Aqueous fluorescent dispersion containing orange colored resin particles having a core-shell configuration was obtained.

Comparative Example—1

Step A and Step B were carried out in a similar manner as described in Example 7(A). Variations introduced in Step A are described below:

Step A Variations: Preparation of Core Polymer:

A third mixture was prepared by mixing styrene (79 g), acrylonitrile (39.5 g), and 2-hydroxyethyl methacrylate (19.7 g).

Comparative Example—2: Preparation of a Polymer Composition

Step A and Step B were carried out in a similar manner as described in Example 1(a). Variations introduced in Step A and Step B are described below:

Step A Variations: Preparation of Core Polymer:

A first mixture was prepared by mixing ammonium lauryl sulfate (5.0 g), polyvinyl alcohol (0.2 g), and water (300 g). The first mixture was heated to a temperature of about 80 degrees Celsius under an atmosphere of nitrogen and allowed to cool to a temperature of about 30 degrees Celsius to form a second mixture. Basic Red 1:1 (7.3 g) and Basic Violet 11 (2.34 g) were added to the second mixture and the resultant mixture was stirred at a rate of about 50 rpm for about 30 minutes. A third mixture was prepared by mixing styrene (86.5 g), acrylonitrile (15.0 g), and 2-hydroxyethyl methacrylate (6.5 g). An aqueous initiator solution (7.5 g) was prepared by dissolving ammonium per sulfate (1.30 g) and ferrous sulfate (0.08 g) in DM water (40.0 g). The fourth mixture was formed by transferring a partial quantity (33 g) of the third mixture and the aqueous initiator solution into the round bottom flask containing the second mixture. The temperature of the reaction mixture was then increased to about 70 degrees Celsius under stirring at about 50 rpm over a period of about 30 minutes and maintained at about 70 degrees Celsius over a period of about 60 minutes to form the fifth mixture including the core polymer.

Step B Variations: Forming the Shell Polymer Over the Core Polymer to Obtain the Polymer Composition:

The seventh mixture (feed 1) in Example 7 was prepared by adding 3-chloro-2-hydroxypropyl methacrylate (1.5 g) and glycidyl methacrylate (0.5 g) to the remaining quantity of third mixture (75 g). The seventh mixture was added to the sixth mixture at a rate of about 25 g per hour under atmospheric conditions in a period of about 3 hours. The eighth mixture (Feed 2, aqueous initiator solution) was prepared by dissolving ammonium persulfate (0.75 g) and ferrous sulfate (0.08 g) in DM water (20.0 g). The eighth mixture was added to the sixth mixture over a period of about 3 hours. After completion of about 2 hours at a temperature of about 70 degrees Celsius, the reaction was further continued at a temperature of about 70 degrees Celsius for an additional 4 hours. The rest of the reaction was the same as described with reference to Example 1(A). Aqueous fluorescent dispersion containing pink colored particles having a core-shell configuration was obtained.

The raw materials and their source used in the reactions are included in Table 1 below. The results of the experiments are discussed below.

TABLE 1

| Function | Trade Name/short name | Chemical Name & Purity | Supplier | Manufacturer |
|---|---|---|---|---|
| Surfactant-aqueous solution | ALS | Ammonium lauryl sulfate, Purity 27-30% | Vinamax Organics Pvt Ltd., | Vinamax Organics Pvt Ltd., |
| Surfactant | SLS | Sodium lauryl sulphate, Purity 93% | Aarti Industries Ltd | Aarti Industries Ltd |
| IS(c) | A103 | Aerosol 103 | Cytec Korea Inc | Cytec Korea Inc |
| Non-ionic Surfactant | Triton ™ X 405 | Triton ™ X 405 | Vimal Intera Trade | Evonik Industries |
| CPAS | Carbopol ™ 940 | Kadpol ™ 940, Purity 56-68% | Shree Chemicals | Shree Chemicals |
| Optical Brightener | Optical Brightener | 2,5-bis(5-tert-butylbenzoxazolyl-2') thiophene 98% purity | Nanjing Lungkay | Nanjing Lungkay |
| Dye stuff 1 | Basic Red 1:1 | Basic Red 1:1 | HUPC Chemical Co., Ltd | HUPC Chemical Co., Ltd |
| Dye stuff 2 | Basic Violet 11:1 | Basic Violet 11:1 | HUPC Chemical Co., Ltd | HUPC Chemical Co., Ltd |

TABLE 1-continued

| Function | Trade Name/short name | Chemical Name & Purity | Supplier | Manufacturer |
|---|---|---|---|---|
| Dye stuff 3 | Basic Yellow 40 | Basic Yellow 40 | Ruchika Chemcials | Ruchika Chemcials |
| Dye stuff 4-DGV | Basic Violet 11 | Basic Violet 11 | Hebei Xingyu Chemical Co., Ltd | Hebei Xingyu Chemical Co., Ltd |
| Dye stuff 5-VS | Solvent Violet 13 | Solvent Violet 13 | Neelikon Food Dyes and Chemicals Ltd., | Neelikon Food Dyes and Chemicals Ltd., |
| Surfactant | TEGO WET 500 | Oxirane, methyl-, polymer with oxirane, mono(3,5,5-trimethylhexyl) ether, Purity 95% | Vimal Intera Trade | Evonik Industries |
| Polyvinyl alcohol | PVA | Aqueous Polyvinyl alcohol 15% purity | Balaji Industries | Balaji Industries |
| Chelating agent | EDTA | Sodium salt of ethylenediaminetetraacetic acid, purity 99% | Sri Trimula Chemicals | Fischer Scientific |
| Monomer Formula VI | Na AMPS | Sodium salt of 2-acrylamido-2-methylpropane sulfonic acid, 50% purity | Vinati Organics ltd | Vinati Organics ltd |
| Monomer Formula 1 | Styrene | Purity 99.94% | Pon Pure | Sabic |
| Monomer Formula II | Acrylonitrile | Purity 99.50% | Ultima Chemicals | Mitsubishi Rayon America Inc |
| Monomer Formula IV | HEMA | 2-hydroxyethyl methacrlate, Purity 98.98% | Vimal Intera Trade | Evonik Industries |
| Monomer Formula IV | HPMA | 3 Hydroxy propyl methacylate, 97% purity | Vimal Intera Trade | Dow Chemicals |
| Monomer Formula III | BzMA | Benzyl methacrylate, purity 98.1% | Somu & CO | Mitsubishi Rayon America Inc |
| Monomer Formula III | MMA | Methylmethacrylate, purity 99.0% | Somu & CO | Mitsubishi Rayon America Inc |
| Monomer Formula III | GMA | Glycidylmethacrylate, purity 97% | Sumitto Industires | Dow Chemicals |
| Monomer Formula III | MA | Maleic anhydride, purity 98% | Somu & CO | Mysore Petro Chemicals |
| Monomer Formula III | MAA | Methacrylic acid, purity 98% | Vimal Intera Trade | Dow Chemicals |
| Aqueous initiator | APS | Ammonium per sulphate, purity 99.5% | Somu & CO | |
| Redox initiator | FRS | Ferrous sulphate, purity 99.5% | Sri Trimula Chemicals | Fischer Scientific |
| Redox agent | SMBS | Sodium metabisulphite, purity 95% | Somu & CO | |
| Terminator | TBHP | Tertiary butylhydroperoxide, purity 70% | Jain & Jain | Jain & Jain |
| GUM | AG | Sodium salt of Alginate | | |
| Solvent | Methanol | Methanol, purity 99.5% | Somu & CO | |
| Solvent | Demineralized water | D M Water | Maruti Enterprises | Maruti Enterprises |
| Monomer Formula III | CHPMA | 3-chloro-2 hydroxy propyl methacrylate, purity 99.5% | Syneric Consultant | Sigma Aldrich |
| Cross-linker | TMPTMA | Trimethylol propane trimethacrylate | Ess Emm Chemicals | Evonik Industries |
| Solvent | Isopropanol | | Somu & CO | |
| Solvent | Propylene glycol | | Somu & CO | |
| Solvent | De odourised Kerosene | | Somu & CO | |
| For forming powder form | Fumed silica | | Somu & CO | |
| Optical Brightener PF | OB | 1.2 di(5-mythyl-benziazolyl)ethylene, Purity - 98% | Zhejiang Transfar Whyyon Chemical Co., Ltd | Zhejiang Transfar Whyyon Chemical Co., Ltd |

TABLE 2

Table 2: Polymer composition prepared using different Surfactant, HPMA and high quantity of NaAMPS.

| Raw Material | Example 1(A) | Example 1(C) | Example 1(D) | Example 1(E) |
|---|---|---|---|---|
| Water | 384.89 | 384.89 | 384.89 | 384.89 |
| PVA | 0.20 | 0.20 | 0.20 | 0.20 |
| Ammonium lauryl sulfate | 10.00 | — | 10.00 | 10.00 |
| sodium lauryl sulfate | 0 | 4.00 | 0 | 0- |
| NaEDTA | 0.10 | 0.10 | 0.10 | 0.10 |
| NaAMPS | 6.60 | 6.60 | 15.00 | 6.60 |
| Styrene | 53.30 | 53.30 | 53.30 | 53.30 |
| Acrylonitrile | 45.70 | 45.70 | 45.70 | 45.70 |
| HEMA | 39.30 | 39.30 | 39.30 | 0 |
| HPMA | 0 | 0 | 0 | 39.30 |
| CHPMA | 3.50 | 3.50 | 3.50 | 3.50 |
| GMA | 1.00 | 1.00 | 1.00 | 1.00 |
| TMPTMA | 12.00 | 0- | 12.00 | 12.00 |
| Dyestuff 1 | 1.95 | 1.95 | 1.95 | 1.95 |
| Dyestuff 2 | 1.25 | 1.25 | 1.25 | 1.25 |
| Methanol | 3.00 | 3.00 | 3.00 | 3.00 |
| APS | 2.4483 | 2.4483 | 2.4483 | 2.448 |
| FRS | 0.1499 | 0.1499 | 0.1499 | 0.1499 |

NOTE:
all amounts are in grams throughout all tables in specification

These experiments were carried out with a view to study the effect os NaAMPS on the light fastness—dE* and the strength of the resultant polymer composition.

Table 3 provides the result of light fastness test carried out for the polymeric compositions prepared with different surfactants, HPMA, and high quantity of NaAMPS.

TABLE 3

| | Light fastness | | Wash fastness | |
|---|---|---|---|---|
| Example | dE* | Strength | dE* | Strength |
| Example 1(A) | 5.823 | 90.858 | 5.864 | 91.405 |
| Example 1(C) | 7.342 | 89.992 | 5.199 | 87.872 |
| Example 1(D) | 6.669 | 91.13 | 8.877 | 58.576 |
| Example 1(E) | 7.537 | 84.603 | — | — |

Note:
dE* has no units, and strength is in percent throughout the specification.

As observed from the results included in Table 3 above, polymeric dyestuff compositions prepared using comparatively high quantity of NaAMPS (15 g) as in Example 1(D) showed a relatively lower wash fastness as compared to that of Example 1(A) where NaAMPS (6.6 g) was employed. The light fastness is within the desired range of dE* within a range of from about 1 to about 10 and color strength in the range of about 75 to 100 percent. Polymeric dyestuff compositions prepared with HPMA in Example 1(E) showed similar light fastness as compared to the of polymeric dyestuff compositions prepared with HEMA in Examples (1 (A) to 1(D)).

Table 4 provides polymer compositions with different colors:

Pink (Example 1(A)), Magenta (Example 2(A)), Rose (Example 3); Chrome (Example 4(A)), Yellow (Example 6); Red (Example 8(A)); Red (Example 8(B)).

TABLE 4

| Raw Material | Example 1(A) | Example 2(A) | Example 3 | Example 4(A) | Example 6 | Example 7 | Example 8(A) | Example 8(B) |
|---|---|---|---|---|---|---|---|---|
| Water | 384.89 | 385.37 | 440.79 | 365.72 | 365.57 | 409.85 | 389.85 | 347.25 |
| PVA | 0.20 | 0.20 | 0.20 | 0.20 | 0.20 | 0.20 | 0.20 | 2.0 |
| Ammonium lauryl sulfate | 10.00 | 9.00 | 10.00 | 8.00 | 8.00 | 10.00 | 8.00 | 25.0 |
| Triton ™ X405 | — | 1.2 | — | 1.00 | 1.00 | — | 1.00 | — |
| NaEDTA | 0.10 | 0.10 | 0.10 | 0.10 | 0.10 | 0.10 | — | 0.6 |
| NaAMPS | 6.60 | 6.60 | 7.00 | 6.60 | 6.60 | 7.00 | 7.00 | 15 |
| CPAS | — | — | 2.60 | — | — | 2.67 | 2.67 | — |
| Styrene | 53.30 | 53.30 | 51.50 | 53.30 | 53.30 | 51.50 | 49.206 | 53.3 |
| Acrylonitrile | 45.70 | 45.70 | 54.60 | 45.70 | 45.70 | 54.60 | 55.766 | 45.7 |
| HEMA | 39.30 | 39.30 | 54.60 | 39.90 | 39.30 | 54.60 | 62.966 | 39.3 |
| CHPMA | 3.50 | 3.50 | 3.50 | 3.50 | 3.50 | — | — | — |
| GMA | 1.00 | 1.00 | 1.00 | 1.00 | 1.00 | — | — | 1 |
| TMPTMA | 12.00 | 10.00 | 5.60 | 10.00 | 10.00 | — | 3.73 | 3.5 |
| Dye stuff 1 | 1.95 | — | 0.74 | — | 0.46 | — | 3.2318 | 0.76 | 0.653 |
| Dye stuff 2 | 1.25 | 3.062 | 4.91 | — | — | 1.50 | 0.77 | — |
| Dye stuff 3 | — | — | — | 3.68 | 3.20 | 1.15 | 3.42 | 3.658 |
| Dyestuff 4 | — | — | — | 0.03 | — | — | — | 0.661 |
| Dyestuff 5 | — | 0.14 | — | — | — | — | — | — |
| MeOH | 3.00 | 3.00 | 3.00 | 3.00 | 3.00 | 3.00 | — | — |
| APS | 2.4483 | 1.994 | 3.0246 | 1.6694 | 1.8112 | 1.9592 | 1.9592 | 1.1356 |
| FRS | 0.1499 | 0.227 | 0.1858 | 0.1024 | 0.1112 | 0.1242 | 0.1242 | — |
| Propylene glycol | — | — | — | — | — | — | — | 3.5 |

TABLE 4-continued

| Raw Material | Example 1(A) | Example 2(A) | Example 3 | Example 4 (A) | Example 6 | Example 7 | Example 8 (A) | Example 8 (B) |
|---|---|---|---|---|---|---|---|---|
| Maleic anhydride | — | — | — | — | — | — | — | 1.5 |
| Methyl acrylic acid | | | | | | | | 1.5 |
| TBHP | | | | | | | | 0.75 |
| SMBS | | | | | | | | 0.0804 |

These experiments were carried out with a view to study the effect of various colorants on the dE* and strength of the resultant polymer composition.

Table 5: provides the result of light fastness test carried out for the polymeric compositions prepared for different colors.

within the desired range of dE* within a range of from about 1 to about 10 and color strength in the range of about 75 to 100 percent.

Table 6: provides examples of polymeric compositions with and without cross-linker TMPTMA (trimethylolpropane trimethacrylate)

TABLE 6

| Raw Material | Example 1(A) | Example 1(B) | Example 2(A) | Example 2(B) | Example 4(A) | Example 4(B) |
|---|---|---|---|---|---|---|
| Water | 384.89 | 384.89 | 385.37 | 409.84 | 365.72 | 365.72 |
| PVA | 0.20 | 0.20 | 0.20 | 0.20 | 0.20 | 0.20 |
| Ammonium lauryl sulfate | 10.00 | 10.00 | 9.00 | 9.60 | 8.00 | 8.00 |
| Triton ™ X 405 | — | — | 1.00 | 1.00 | 1.00 | 1.00 |
| NaEDTA | 0.10 | 0.10 | 0.10 | 0.10 | 0.10 | 0.10 |
| NaAMPS | 6.60 | 6.60 | 6.60 | 7.00 | 6.60 | 6.60 |
| Styrene | 53.30 | 53.30 | 53.30 | 53.30 | 53.30 | 53.30 |
| Acrylonitrile | 45.70 | 45.70 | 45.70 | 56.40 | 45.70 | 45.70 |
| HEMA | 39.30 | 39.30 | 39.30 | 56.40 | 39.30 | 39.30 |
| CHPMA | 3.50 | — | 3.50 | — | 3.50 | 3.50 |
| GMA | 1.00 | — | 1.00 | — | 1.00 | 1.00 |
| TMPTMA | 12.00 | — | 10.00 | — | 10.00 | — |
| Dye stuff 1 | 1.95 | 1.95 | — | 0.919 | 0.46 | |
| Dye stuff 2 | 1.25 | 1.25 | 3.062 | 4.282 | | |
| Dye stuff 3 | — | — | — | — | 3.68 | 3.68 |
| Dye Stuff 4 | — | — | — | — | — | 0.038 |
| Dye Stuff 5 | — | — | 0.14 | 0.169 | — | — |
| Methanol | 3.00 | 3.00 | 3.00 | 3.00 | 3.00 | 3.00 |
| APS | 2.4483 | 2.4483 | 1.994 | 2.0191 | 1.6694 | 1.6694 |
| FRS | 0.1499 | 0.1499 | 0.227 | 0.9529 | 0.1024 | 0.1024 |

TABLE 5

| | Light fastness | | Wash fastness | |
|---|---|---|---|---|
| Example | dE* | Strength | dE* | Strength |
| Example 1A | 5.823 | 90.858 | 5.864 | 91.405 |
| Example 2A | 4.817 | 87.046 | 4.262 | 79.794 |
| Example 3 | 6.605 | 84.278 | 2.667 | 83.582 |
| Example 4(A) | 9.26 | 79.59 | 8.895 | 85.952 |
| Example 6 | 6.828 | 74.106 | 14.446 | 90.019 |
| Example 7 | 2.319 | 98.794 | 2.806 | 96.365 |
| Example 8(A) | 4.1 | 80.262 | 9.557 | 71.5 |

In light and wash fastness properties, red and pink colored polymeric dyestuff compositions showed improved dE* and color strength values. Yellow and chrome polymeric dyestuff compositions showed high dE* values in washing and light fastness. Strength of yellow and chrome polymeric dyestuff compositions though improved is relatively low in light fastness compared to wash fastness with reference to the red and pink colored compositions. Magenta, orange and rose polymeric dyestuff compositions showed moderate dE* values and moderate strength. These results demonstrate that the polymeric dyestuff compositions prepared using the instant disclosure have a light fastness and wash fastness These experiments were carried out with a view to study the effect of presence or absence of a cross-linker on the dE* and strength of the resultant polymer composition.

Table 7: provides the result of light fastness test carried out for the polymeric compositions prepared with and without cross-linking agent, i.e., TMPTMA.

TABLE 7

| | Light fastness | | Wash fastness | |
|---|---|---|---|---|
| EXAMPLES | dE* | Strength | dE* | Strength |
| Example 1(A) | 5.823 | 90.858 | 5.864 | 91.405 |
| Example 1(B) | 5.784 | 87.816 | 5.572 | 72.369 |
| Example 2(A) | 5.329 | 93.34 | 1.061 | 95.928 |
| Example 2(B) | 4.817 | 87.046 | 4.262 | 79.794 |
| Example 4(A) | 5.64 | 88.439 | 8.895 | 85.952 |
| Example 4(B) | 9.26 | 79.59 | 9.168 | 76.555 |

From the results provided in Table 7 it is observed that the incorporation of trimethylolpropane trimethacrylate (cross-linker) in the fluorescent dispersions simultaneously improves dE* and color strength in both the light fastness and wash fastness properties as seen in Examples 1A, 2A, and 4A. The improved strength may be correlated to an increase in melting point of the polymeric compositions due to increased cross-linking in the polymeric composition.

However the polymer compositions provides satisfactory color strengths and dE* values in the presence or absence of a cross linker. These results demonstrate that the polymeric dyestuff compositions prepared using the instant disclosure have a light fastness and wash fastness within the desired range of dE* within a range of from about 1 to about 10 and color strength in the range of about 75 to 100 percent.

Table 8 provides polymeric compositions with high and low HEMA.

TABLE 8

| Raw Material | Example 1(A) | Example 6 | Comparative Example-2 | Comparative Example-1 |
|---|---|---|---|---|
| Water | 384.89 | 365.57 | 365.57 | 100.74 |
| PVA | 0.20 | 0.20 | 0.20 | 0.10 |
| Ammonium lauryl sulfate | 10.00 | 8.00 | 8.00 | 4.78 |
| Triton ™ X 405 | — | 1.00 | 1.00 | — |
| NaEDTA | 0.10 | 0.10 | 0.10 | 0.10 |
| NaAMPS | 6.60 | 6.60 | 6.60 | 5.30 |
| Styrene | 53.30 | 53.30 | 79.0 | 59.35 |
| Acrylonitrile | 45.70 | 45.70 | 39.50 | 14.14 |
| HEMA | 39.30 | 39.30 | 19.70 | 10.59 |
| CHPMA | 3.50 | 3.50 | 3.50 | — |
| GMA | 1.00 | 1.00 | 1.00 | — |
| TMPTMA | 12.00 | 10.00 | 10.00 | — |
| Dye stuff 1 | 1.95 | — | — | 1.20 |
| Dye stuff 2 | 1.25 | — | — | 0.89 |
| Dye stuff 3 | — | 3.20 | 3.20 | — |
| Methanol | 3.00 | 3.00 | 3.00 | 3.00 |
| APS | 2.4483 | 1.8112 | 1.8112 | 2.12 |
| FRS | 0.1499 | 0.1112 | 0.1112 | 0.06 |
| TBHP | — | — | — | 0.72 |

These experiments were carried out with a view to study the effect of high and low HEMA on the dE* and strength of the resultant polymer composition.

Table 9: provides the result of the light and wash fastness tests carried out for the polymeric compositions prepared with high and low HEMA.

TABLE 9

| EXAMPLES | Light fastness | | Wash fastness | |
|---|---|---|---|---|
| | dE* | Strength | dE* | Strength |
| Example 1(A) | 5.823 | 90.858 | 5.864 | 91.405 |
| Example 6 | 6.828 | 74.106 | 14.446 | 90.019 |
| Comparative Example-1 | 7.232 | 72.307 | 11.497 | 75.445 |
| Comparative Example-2 | 11.256 | 76.552 | 4.596 | 73.792 |

The light and wash fastness result observed for Example 1(A) indicates that the use of higher quantity of HEMA in the preparation of the polymeric composition increases the light and wash fastness property of the polymeric composition when compared to the use of lower quantity of HEMA in Comparative Example—1 and Comparative Example—2. This may be attributed to the increased HEMA improving the dye adaptability with the copolymer and thus improving light and wash fastness properties in terms of both dE* and color strength. In case of Example 6 the dE* for wash fastness is relatively lower than that for Example 1(A) while the strength is within a satisfactory range even for a chrome (yellow) color polymeric dyestuff composition provided by Example 6. These results demonstrate that the polymeric dyestuff compositions prepared using the instant disclosure have a light fastness and wash fastness within the desired range of dE* within a range of from about 1 to about 10 and color strength in the range of about 75 to 100 percent.

Table 10: Polymeric dyestuff compositions (aqueous emulsions) prepared using different dyestuff and their particle sizes in micrometers.

TABLE 10

| Polymeric dyestuff composition | Particle size distribution in micrometers | | |
|---|---|---|---|
| | Dv(10) | Dv(50) | Dv(90) |
| Example 1(A) | 0.0282 | 0.157 | 84.3 |
| Example 1(B) | 0.0201 | 0.0625 | 2.37 |
| Example 1(C) | 0.02 | 0.0605 | 0.773 |
| Example 1(D) | 0.0198 | 0.0603 | 34 |
| Example 1(E) | 0.0197 | 0.0523 | 0.163 |
| Example 1(F) | 0.0194 | 0.0536 | 0.162 |
| Example 2(A) | 0.0194 | 0.054 | 0.193 |
| Example 2(B) | 0.144 | 0.349 | 4.16 |
| Example 3 | 0.22 | 0.397 | 0.748 |
| Example 4(A) | 0.0197 | 0.0581 | 17.9 |
| Example 4(B) | 0.0196 | 0.0572 | 40.8 |
| Example 5 | 0.558 | 11.7 | 41.5 |
| Example 6 | 0.0205 | 0.0641 | 45.1 |
| Example 7 | 0.141 | 0.233 | 1.25 |
| Example 8(a) | 0.0186 | 0.0442 | 0.111 |
| Example 8(b) | 0.0197 | 0.0585 | 4.03 |
| Comparative Example 1 | 0.0203 | 0.05 | 0.127 |
| Comparative Example 2 | 0.0834 | 0.743 | 1.56 |

These experiments show that the particle sizes of the polymeric dyestuff compositions prepared using different dyestuff are in a range of from about 0.02 micrometers to about 85 micrometers.

Example 9: Preparation of Polymer Composition in Powder Form

The aqueous polymer composition obtained in Example 1(A) was filtered to obtain a filter cake. The filter cake i.e., polymer composition (500 g) was first cooled to a temperature of about 30 degrees Celsius. Hydrophilic fumed silica (12 g) was then added to the filtrate polymer composition under stirring condition. The resultant mixture was stirred for a period of about 120 minutes to provide a paste/semi solid form. The paste/semi solid form was spread over a glass plate and then dried in an oven at a temperature of about 80 degrees Celsius for about 5 hours to provide a polymer composition in the form of a dried powder. The dried powder was further milled to obtain a finer powder form having a particle size of about Dv(50) 6.76 micrometer.

Example 10: Preparation of Polymer Composition for Testing on a Sample

A self-cross linked styrene-acrylate based copolymer dispersion (Printo FIX SLN Binder, CLARIENT) (100 g) and deionized water (100 g) were added into a round bottom flask. The resultant mixture was stirred at a temperature of about 30 degrees Celsius for about 30 minutes to provide a thickener solution. Kerosene (800 to 1000 g) was added slowly to the thickener solution under stirring. Printo FIX SLN binder (1.5 g) and pigment powder (1.0 g) were transferred into a steel container and mixed thoroughly till uniform paste was formed. The thickener solution (7.5 g) was added to the steel container and the resultant mixture was mixed thoroughly. Using screen print technique, prints were taken over paper and cotton fabric. Printed papers were dried in the oven at 80 degrees Celsius for 5 minutes. Printed samples were dried in the oven at 160 degrees Celsius for 5 minutes. Later the prints were exposed continuously to a Xenon lamp in Q-Sun equipment. The prints were analyzed after every 10 hour period of exposure to the xenon lamp using a color scan spectrophotometer (Model 5100). dE* and strength values as a function of time of exposure to light were recorded. For comparative study a print sample (prepared in the same manner as described above) using fluorescent pigment prepared in Comparative Example—2 was used. From these figures, it is clear that the powder formed from Example 1(A) showed low i.e., improved dE* and higher strength values as compared to fluorescent pigment prepared in Comparative Example—2.

Example 11: Print Method & Testing Liquid Fluorescent Dispersions

Print paste was prepared by stirring synthetic thickener (1.7 g), binder (15 g), polymeric composition (6 g) and water (1.7 g) for 5 minutes. The cotton fabrics were hand scraped along the radial direction of fabric and baked at 80° C. for 5 minutes and then cured at 115 degrees Celsius for 3 minutes. These printed cotton fabrics are termed as masstone. The cotton fabrics printed with ¼$^{th}$ of the print paste and balance ¾$^{th}$ of binder, baked and cured in similar way, are termed as reduction tone. Premier Color Scan Spectrophotometer (Model No. 5100) was used to scan the spectra ranging from 300-700 nm and to estimate strength and dE*values of printed cloth fabrics. The instrument prior to scanning was calibrated using white tile for 100 percent reflectance. Scanning with white tile in the view port is 100 percent absorbance. In order to study the influence of post addition of aqueous SMA resins to the new dispersions, printed mass tone cotton fabrics (cloth)/paper were exposed under Q-Sun Xenon Test Chamber of Model Xe-1 at 0.3 W sun and at about 400 degrees Celsius for a period of about 10 hours. The cotton fabrics (cloth)/paper were then scanned with Premier Color Scan Spectrophotometer to measure the loss of strength and dE* values relative to unexposed fabric samples.

Table 11 provides the Color fastness Color fastness to light (Q-Sun Data) as function of exposure time (On Paper)—Samples prepared in Example 11 using polymer compositions prepared in Comparative Example—2 and Example 1(A).

TABLE 11

| TIME (hrs) | EXAMPLE 1(A) | | COMPARATIVE EXAMPLE-2 | |
| --- | --- | --- | --- | --- |
| | dE* | Strength | dE* | Strength |
| 10 | 9.7 | 83.8 | 20.2 | 53.5 |
| 20 | 14.0 | 80.3 | 29.1 | 38.3 |

TABLE 11-continued

| TIME (hrs) | EXAMPLE 1(A) | | COMPARATIVE EXAMPLE-2 | |
| --- | --- | --- | --- | --- |
| | dE* | Strength | dE* | Strength |
| 30 | 16.6 | 71.5 | 37.5 | 23.4 |
| 40 | 18.8 | 71.5 | 44.8 | 18.7 |
| 50 | 24.0 | 65.7 | 45.6 | 17.9 |
| 60 | 26.4 | 60.0 | 49.1 | 13.5 |
| 70 | 32.7 | 45.8 | 50.5 | 14.1 |
| 80 | 31.8 | 49.7 | 54.8 | 9.8 |
| 90 | 35.3 | 39.9 | 56.2 | 8.8 |

Table 12 provides the Color fastness to light (Q-Sun Data) as function of exposure time (On Cloth)

TABLE 12

| TIME (hrs) | EXAMPLE 1(A) | | COMPARATIVE EXAMPLE-2 | |
| --- | --- | --- | --- | --- |
| | dE* | Strength | dE* | Strength |
| 10 | 9.4 | 85.8 | 29.0 | 47.8 |
| 20 | 14.7 | 76.3 | 40.8 | 32.0 |
| 30 | 16.6 | 75.4 | 47.7 | 22.1 |
| 40 | 18.6 | 70.3 | 49.3 | 19.8 |
| 50 | 21.1 | 71.7 | 52.4 | 16.8 |
| 60 | 23.6 | 67.0 | 55.1 | 13.5 |
| 70 | 27.5 | 59.7 | 61.7 | 10.1 |
| 80 | 28.8 | 53.9 | 63.2 | 8.0 |
| 90 | 29.9 | 49.1 | 65.2 | 8.4 |

In one embodiment, as disclosed hereinabove the tenth mixture may be subjected to an evaporation step to form a concentrate. The concentrate may then be provided a thermal treatment to form a polymer composition in a concentrate form. For example, a thermal treatment may include the following steps. After completion of addition of feed 1 and feed 2, the resultant ninth mixture may be heated to a temperature of about 80 degrees Celsius in a period of about 30 minutes and maintained at 80 degree Celsius for about 60 minutes. The resultant mixture may then be heated to a temperature of about 90 degree Celsius in a period of about 30 minutes and maintained at 80 degree Celsius for about 60 minutes. The resultant mixture may then be concentrated under high vacuum distillation at a temperature of about 40 to 50 degree Celsius to achieve a total solid content of about 40 percent. The resultant mixture may be heated to a temperature of about 80 degrees Celsius in a period of about 30 minutes and maintained at 80 degree Celsius for about 8 hours and then allowed to cool to room temperature.

Table 13 provides the effect of the heat (thermal) treatment on Example 3, Example 2(A), Example 7, and Example 8(A).

TABLE 13

| | | EXAMPLE 3 | | | | EXAMPLE 2 (A) | | | |
| --- | --- | --- | --- | --- | --- | --- | --- | --- | --- |
| | | Before Thermal treatment | | Thermal treatment | | Before Thermal treatment | | Thermal treatment | |
| PROPERTIES | | dE* | strength | dE* | strength | dE* | strength | dE* | strength |
| LIGHT FASTNESS | | 7.7 | 81.4 | 7.2 | 81.1 | 7.0 | 80.4 | 7.9 | 84.1 |
| WASH FASTNESS | | 5.7 | 73.0 | 4.0 | 76.3 | 7.2 | 60.4 | 9.2 | 56.4 |

TABLE 13-continued

| | EXAMPLE 8(A) | | | | EXAMPLE 7 | | | |
|---|---|---|---|---|---|---|---|---|
| | Before Thermal treatment | | Thermal treatment | | Before Thermal treatment | | Thermal treatment | |
| PROPERTIES | dE* | strength | dE* | strength | dE* | strength | dE* | Strength |
| LIGHT FASTNESS | 7.0 | 73.5 | 4.2 | 81.2 | 4.6 | 72.0 | 4.2 | 74.0 |
| WASH FASTNESS | 11.7 | 62.7 | 13.6 | 56.7 | 9.8 | 56.8 | 8.6 | 64.2 |

The results provided in Table 13 demonstrate that the thermal treatment improves either or both the dE* values and the strength values with respect to light and wash fastness.

As used herein dE* means delta E*. An organization called CIE (Commision Internationalede l'Eclairage) determines standard values that are used worldwide to measure color and values used are called L*, a* and b* and the color measurement method is called CIELAB. L* represents the difference between light (where L*=100) and dark (where L*=0). A* represents the difference between green (−a*) and red (+a*), and b* represents the difference between yellow (+b*) and blue (−b*). Using this system any color corresponds to a place on the graph shown in FIGURE in the next slide. Variables of L*, a*, b* or E* are represented as delta L*, delta a*, delta b* or delta E*, where delta E*=delta (delta L*2+delta a*2+delta b*2). It represents the magnitude of the difference in color, but does not indicate the direction of the color difference.

Thus the polymer composition disclosed herein includes (i) a core-shell structural copolymer particles in water as vehicle (ii) active ingredients like dyes, optical brighteners, UV absorbers, etc. . . . and (iii) aqueous dispersion containing copolymer particles. The polymer composition may be (i) concentrated by removal of water and volatile impurities, followed by (ii) addition of additives such as surfactant, glycols, polymeric additives, etc. . . . and then (iii) concentrated to powder form.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Terms such as "first," "second," and other numerical terms when used herein do not imply a sequence or order unless clearly indicated by the context. Thus, a first step discussed herein could be termed a second step without departing from the teachings of the exemplary embodiments.

The foregoing embodiments meet the overall objectives of this disclosure as summarized above. However, it will be clearly understood by those skilled in the art that the foregoing description has been made in terms only of the most preferred specific embodiments. Therefore, many other changes and modifications clearly and easily can be made that are also useful improvements and definitely outside the existing art without departing from the scope of the present disclosure, indeed which remain within its very broad overall scope, and which disclosure is to be defined over the existing art by the appended claims.

We claim:

1. A particulate polymer composition comprising: at least one active ingredient encapsulated in a polymer shell enveloped over a polymer core resulting in core/shell structured water insoluble polymeric particles being produced from in-situ microemulsion polymerization, forming stable and uniform aqueous dispersions;

wherein the polymer core comprises a polymer comprising structural units derived from monomers having a Formula I, Formula II, optional Formula V, and Formula VI:

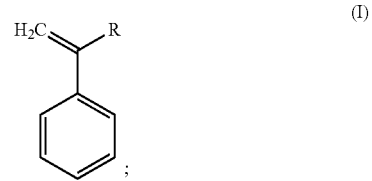

(I)

(II)

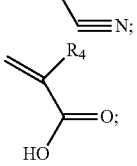

(V, optional) and

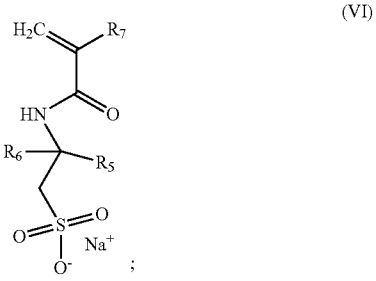

(VI)

and a structural unit derived from a monomer selected from a group consisting of monomers having a Formula III and Formula IV:

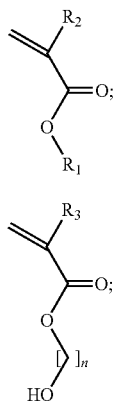

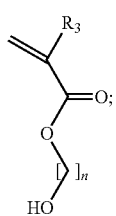

wherein in the core polymer the monomers having Formula I is present in a range of from about 21 weight percent to about 57 weight percent based on total weight of the polymer core; the monomer having Formula II is present in a range of from about 18 weight percent to about 26 weight percent based on the total weight of the polymer core, and the monomer having Formula III or Formula IV is present in a range of from about 0 weight percent to about 29 weight percent based on the total weight of the polymer core; the monomer having Formula V is present in a range of from about 0 weight percent to about 7.0 weight percent based on the total weight of the polymer core, and the monomer having Formula VI is present in a range of from about 0 weight percent to about 38 weight percent based on the total weight of the polymer core;

wherein the polymer shell comprises:

at least one active ingredient;

a polymer comprising structural units derived from a monomer having Formula I, and Formula II:

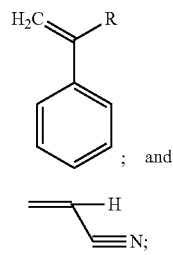

and a structural unit derived from a monomer selected from a group consisting of monomers having a Formula III and Formula IV:

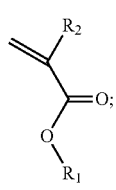

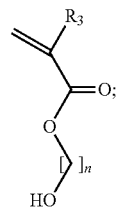

wherein in the polymer shell the monomer having Formula I is present in a range of from about 21 weight percent to about 30 weight percent based on total weight of the polymer shell; the monomer having Formula II is present in a range of from about 29 weight percent to about 34 weight percent based on the total weight of the polymer shell, and the monomer having Formula III or Formula IV is present in a range of from about 30 weight percent to about 60 weight percent based on the total weight of the polymer shell and the active ingredient is present in a range of from about 1.94 weight percent to about 5.59 weight percent based on total weight of the polymer shell, a total weight percent of core polymer based on the total weight of the particulate polymer composition ranges from 9.3 to 16.8, and a total weight percent of shell polymer based on the total weight of the particulate polymer composition ranges from 83.1 to 90.6;

wherein:

R is an aromatic group selected from the groups consisting of benzyl, methyl benzyl, benzoyl, ethyl benzoyl, hydroxyl benzoyl, propyl benzyl, cyclohexyl benzyl, hydroxyl phenoxy, phenyl acrylate, 6-phenyl hexyl acrylate, 6-phenyl hexyl methacrylate, phenyl lauryl acrylate, phenyl lauryl methacrylate, and 3-nitrophenyl-6-hexyl methacrylate; $R_1$ is an aliphatic group having 1 to 4 carbon atoms; $R_2$ is hydrogen or an aliphatic group having 1 to 4 carbon atoms; $R_3$ is an hydrogen or an aliphatic group having 1 to 4 carbon atoms; $R_4$ is an aliphatic group having 1 to 4 carbon atoms; $R_5$ is an aliphatic group having 1 to 4 carbon atoms; $R_6$ is an aliphatic group having 1 to 5 carbon atoms; $R_7$ is an hydrogen or an aliphatic group having 1 to 4 carbon atoms; and "n" is an integer having a value of 1 to 4;

wherein the at least one active ingredient comprises one of a dyestuff, an optical brightener, an ultraviolet radiation absorber, or a combination thereof and is incorporated into the polymer shell by encapsulation during the formation by free radical microemulsion polymerization.

2. The particulate polymer composition in claim 1, wherein the active ingredients encapsulated shell enveloped over a core polymer resulting in core/shell structured polymeric particles have a particle size in a range of from about 0.02 micrometers to about 85 micrometer.

3. The particulate polymer composition as claimed in claim 1, wherein the monomer having Formula I is styrene.

4. The particulate polymer composition as claimed in claim 1, wherein the monomer having Formula H is acrylonitrile.

5. The particulate polymer composition as claimed in claim 1, wherein the monomer having Formula III is benzyl methacrylate.

6. The particulate polymer composition as claimed in claim 1, wherein the monomer having Formula IV is 2-hydroxyethylmethacrylate.

7. The particulate polymer composition as claimed in claim 1, wherein the monomer having Formula IV is 2-hydroxypropylmethacrylate.

8. The particulate polymer composition as claimed in claim 1, wherein the monomer having Formula V is methyl acrylic acid.

9. The particulate polymer composition as claimed in claim 1, wherein the monomer having Formula VI is sodium salt of 2-acrylamido-2-methylpropane sulfonic acid.

10. The particulate polymer composition as claimed in claim 1, wherein the polymer composition is in an emulsion form.

11. The particulate polymer composition as claimed in claim 1, wherein the polymer composition is in a powder form.

12. The particulate polymer composition as claimed in claim 1, wherein the polymer composition is used as a colorant, a polymer coat on colored fabrics, in UV rays absorbing compositions, and in whitening compositions.

* * * * *